(12) United States Patent
Matsuda

(10) Patent No.: US 9,544,753 B2
(45) Date of Patent: Jan. 10, 2017

(54) COMMUNICATION APPARATUS

(71) Applicant: Brother Kogyo Kabushiki Kaisha, Nagoya-shi, Aichi-ken (JP)

(72) Inventor: Munehisa Matsuda, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 462 days.

(21) Appl. No.: 13/625,818

(22) Filed: Sep. 24, 2012

(65) Prior Publication Data

US 2013/0137414 A1     May 30, 2013

(30) Foreign Application Priority Data

Nov. 30, 2011   (JP) ................................ 2011-261538

(51) Int. Cl.
*H04B 7/15*      (2006.01)
*H04M 3/00*      (2006.01)
(Continued)

(52) U.S. Cl.
CPC .............. *H04W 8/005* (2013.01); *H04W 8/18* (2013.01); *H04W 88/06* (2013.01)

(58) Field of Classification Search
CPC .............. H04N 1/00214; H04N 1/0022; H04N 1/00315; H04N 1/00347; H04N 1/00482; H04N 1/00413; H04N 1/0049; H04N 1/324; H04N 1/32641; H04N 1/32609; H04N 1/32673; H04N 1/32797; H04N 1/3333; H04N 1/33307; H04N 1/33361; H04N 1/33392; H04N 1/00307; H04N 1/00474; H04N 1/00891; H04N 1/00896; H04N 1/0482; H04N 1/32363; H04N 1/32368; H04N 1/3202; H04N 1/33315; H04W 12/06; H04W 36/14; H04W 36/0011; H04W 36/0016; H04W 36/0022; H04W 36/0083; H04W 36/30; H04W 48/08; H04W 52/0235; H04W 76/02; H04W 84/12; H04W 84/18; H04W 88/04; H04W 88/06; H04B 5/00; H04B 5/0025; H04B 5/005; H04B 5/0056; H04B 5/02; H04B 5/04; H04B 5/06; H04B 84/12; H04B 84/18; H04B 7/00; G06F 3/1205; G06F 3/1208; G06F 3/1231; G06F 3/1236; G06F 3/1256; G06F 3/1285; G06F 3/129
See application file for complete search history.

(56) References Cited

U.S. PATENT DOCUMENTS 7,822,718 B1 *   10/2010   Wilson ................ H04L 41/0856
                                              707/684
2005/0170774 A1 *   8/2005   Shiohara ............... H04W 76/02
                                              455/11.1
(Continued)

FOREIGN PATENT DOCUMENTS

JP    2007-288312 A    11/2007
JP    2012-119757 A    6/2012

*Primary Examiner* — Yuwen Pan
*Assistant Examiner* — Paul P Tran
(74) *Attorney, Agent, or Firm* — Merchant & Gould P.C.

(57) ABSTRACT

A first communication apparatus for performing wireless communication with a second communication apparatus includes a memory storing a predetermined wireless setting and a confirmation unit confirming whether it is possible to perform wireless communication with the second communication apparatus using a current wireless setting in the first communication apparatus. The first communication apparatus includes a first change unit changing the current wireless setting to the predetermined wireless setting if it is not possible to perform wireless communication using the current wireless setting and specific information is received from the second communication apparatus, and holding the (Continued)

current wireless setting if it is not possible to perform wireless communication using the current wireless setting and the specific information is not received from the second communication apparatus. Further, the first communication apparatus includes a first communication execution unit receiving first target data from the second communication apparatus using the predetermined wireless setting.

8 Claims, 10 Drawing Sheets

(51) Int. Cl.
*H04B 1/38* (2015.01)
*G06F 3/12* (2006.01)
*H04N 1/00* (2006.01)
*H04L 12/26* (2006.01)
*H04W 4/00* (2009.01)
*H04L 12/66* (2006.01)
*G06F 15/173* (2006.01)
*G06F 15/16* (2006.01)
*G06F 13/12* (2006.01)
*G06F 13/38* (2006.01)
*G06F 3/00* (2006.01)
*H04W 8/00* (2009.01)
*H04W 88/06* (2009.01)
*H04W 8/18* (2009.01)

(56) References Cited

U.S. PATENT DOCUMENTS

| | | | |
|---|---|---|---|
| 2006/0268743 A1* | 11/2006 | Yoshida | H04W 48/10 370/254 |
| 2008/0094659 A1* | 4/2008 | Ito | G06F 3/1204 358/1.15 |
| 2008/0205316 A1* | 8/2008 | Minematsu et al. | 370/310 |
| 2009/0092106 A1* | 4/2009 | Nakayama | 370/338 |
| 2010/0020186 A1* | 1/2010 | Matsui | H04N 1/00249 348/211.2 |
| 2010/0245903 A1* | 9/2010 | Sakakibara | 358/1.15 |
| 2010/0245931 A1* | 9/2010 | Sato | 358/407 |
| 2012/0076069 A1* | 3/2012 | Ogura | 370/315 |
| 2012/0133983 A1 | 5/2012 | Kojima | |

* cited by examiner (FIRST ILLUSTRATIVE EMBODIMENT)

(FIRST ILLUSTRATIVE EMBODIMENT)

(FIRST ILLUSTRATIVE EMBODIMENT)
(CASE B) FAX IS TRANSMITTED TO PSTN (SECOND ILLUSTRATIVE EMBODIMENT)

(SECOND ILLUSTRATIVE EMBODIMENT)

COMMUNICATION APPARATUS

CROSS-REFERENCE TO RELATED APPLICATION

This application is based upon and claims the benefit of priority of Japanese Patent Application No. 2011-261538 filed on Nov. 30, 2011, the contents of which are incorporated herein by reference in its entirety.

BACKGROUND

The present disclosure relates to a communication apparatus performing wireless communication.

For example, a system is known in which enables a pair of devices to perform wireless communication through an access point. That is, a wireless communication technology of an infrastructure mode is known. In the meantime, a technology enabling a pair of devices to perform wireless communication without through an access point has been also known. That is, a wireless communication technology of an ad hoc mode has been also known.

SUMMARY

In any wireless communication technology of the infrastructure more and the ad hoc mode, it is necessary to set the same wireless setting (for example, authentication method, encryption method and the like) for each of the pair of devices so that the pair of devices can appropriately perform wireless communication. That is, when the different wireless settings are set for the pair of devices, the pair of devices cannot appropriately perform wireless communication. Also, even when the same wireless setting is set for the pair of devices, the pair of device may not appropriately perform wireless communication due to communication environments (for example, a long distance between a device and an access point).

Aspects of the present disclosure provides a technology capable of suppressing a situation where a pair of devices cannot appropriately perform wireless communication, and provides the following arrangements:

A first communication apparatus for performing wireless communication with a second communication apparatus, the first communication apparatus comprising:

a memory configured to store a predetermined wireless setting;

a confirmation unit configured to confirming whether it is possible to perform wireless communication with the second communication apparatus by using a current wireless setting that is a wireless setting currently set in the first communication apparatus;

a first change unit configured to change the current wireless setting to the predetermined wireless setting in the memory in a first case where the confirmation unit confirms that it is not possible to perform wireless communication by using the current wireless setting and specific information is received from the second communication apparatus, and configured to hold the current wireless setting in a second case where the confirmation unit confirms that it is not possible to perform wireless communication by using the current wireless setting and the specific information is not received from the second communication apparatus, the specific information being information that is transmitted from the second communication apparatus if first target data that is to be transmitted from the second communication apparatus to the first communication apparatus exists in the second communication apparatus; and a first communication execution unit configured to receive the first target data from the second communication apparatus by using the predetermined wireless setting in the first case.

A second communication apparatus for performing wireless communication with a first communication apparatus, the second communication apparatus comprising:

a memory configured to store a predetermined wireless setting;

a confirmation unit configured to confirm whether it is possible to perform wireless communication with the first communication apparatus by using a current wireless setting that is a wireless setting currently set in the second communication apparatus;

an information transmission unit configured to transmit specific information to the first communication apparatus in a first case where the confirmation unit confirms that it is not possible to perform wireless communication by using the current wireless setting and first target data that is to be transmitted from the second communication apparatus to the first communication apparatus exists in the second communication apparatus, and configured not to transmit the specific information to the first communication apparatus in a second case where the confirmation unit confirms that it is not possible to perform wireless communication by using the current wireless setting and the first target data does not exist in the second communication apparatus;

a second change unit configured to change the current wireless setting to the predetermined wireless setting in the memory in the first case, and a second communication execution unit configured to transmit the first target data to the first communication apparatus by using the predetermined wireless setting in the first case.

A non-transitory computer readable recording medium storing a computer program for a first communication apparatus for performing wireless communication with a second communication apparatus, the first communication apparatus including a memory storing a predetermined wireless setting, the computer program enabling a computer, which is mounted to the first communication apparatus, to execute:

confirming whether it is possible to perform wireless communication with the second communication apparatus by using a current wireless setting that is a wireless setting currently set in the first communication apparatus;

changing the current wireless setting to the predetermined wireless setting in the memory in a first case where it is confirmed that it is not possible to perform wireless communication by using the current wireless setting and specific information is received from the second communication apparatus, the specific information being information that is transmitted from the second communication apparatus when there is target data that is to be transmitted from the second communication apparatus to the first communication apparatus;

holding the first current wireless setting in a second case where it is confirmed that it is not possible to perform wireless communication by using the current wireless setting and the specific information is not received from the second communication apparatus; and receiving the target data from the second communication apparatus by using the predetermined wireless setting in the first case.

A non-transitory computer readable recording medium storing a computer program for a second communication apparatus for performing wireless communication with a first communication apparatus, the second communication apparatus including a memory storing a predetermined wireless setting, the computer program enabling a computer, which is mounted to the second communication apparatus, to execute:

confirming whether it is possible to perform wireless communication with the first communication apparatus by using a current wireless setting that is a wireless setting currently set in the second communication apparatus;

transmitting specific information to the first communication apparatus in a first case where it is confirmed that it is not possible to perform wireless communication by using the current wireless setting and target data that is to be transmitted from the second communication apparatus to the first communication apparatus exists in the second communication apparatus;

deciding not to transmit the specific information to the first communication apparatus in a second case where it is confirmed that it is not possible to perform wireless communication by using the current wireless setting and the target data exists in the second communication apparatus;

changing the current wireless setting to the predetermined wireless setting in the memory in the first case; and transmitting the target data to the first communication apparatus by using the predetermined wireless setting in the first case.

In the meantime, a control method, a computer program and a computer-readable recording medium storing the computer program for implementing the first and second communication apparatuses are also novel and useful. Also, a wireless communication system including the first and second communication apparatuses is also novel and useful.

DESCRIPTION OF EXEMPLARY EMBODIMENTS

First Illustrative Embodiment

Figure 1:
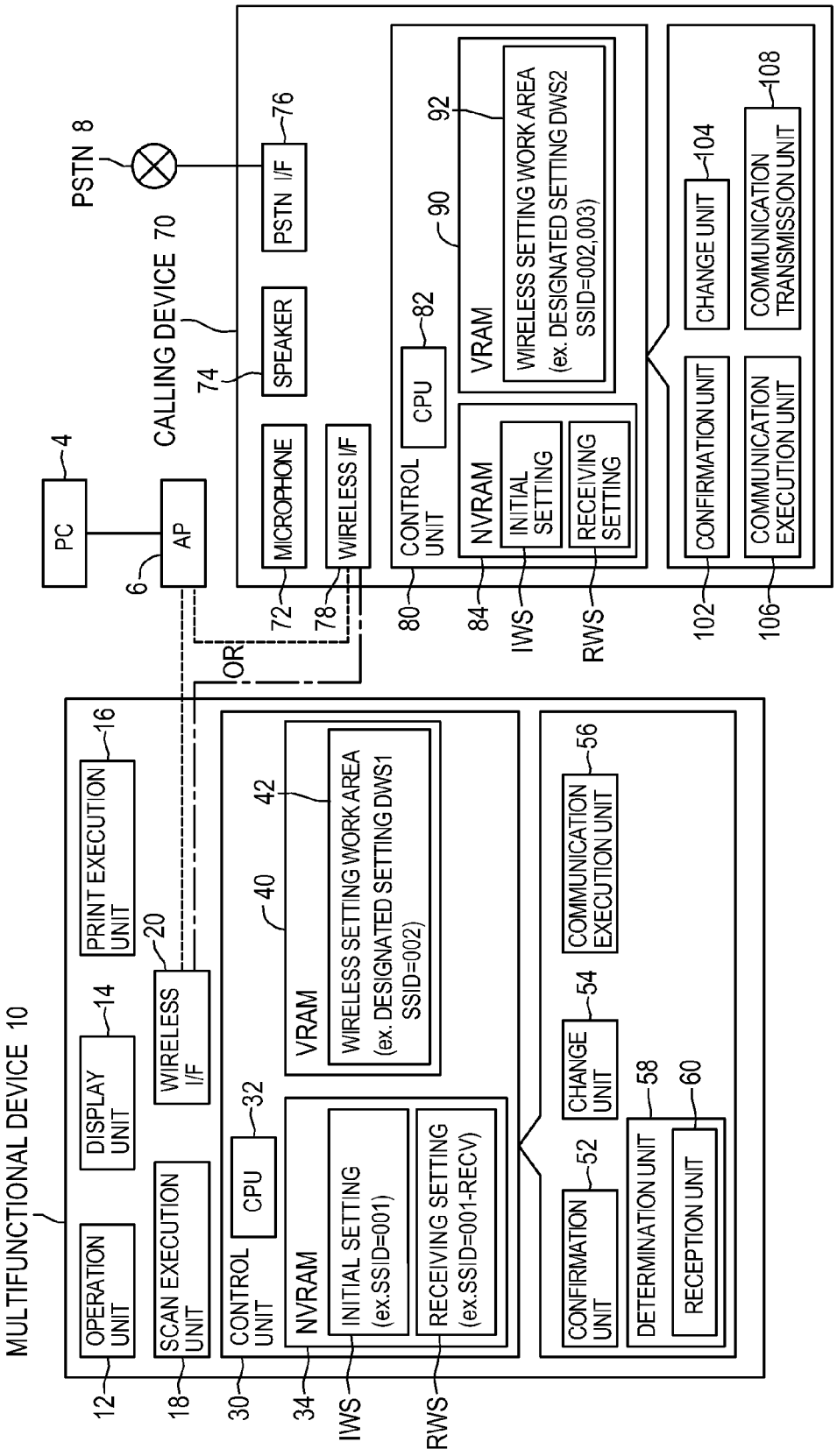
FIG. 1 shows a configuration of a wireless communication system.

Configuration of System; FIG. 1

As shown in FIG. 1, a wireless communication system 2 includes a PC (personal computer) 4, an AP (access point) 6, a multifunctional device 10 and a calling device 70. The PC 4 can perform wireless communication with the other devices (for example, the multifunctional device 10) through the AP 6. The multifunctional device 10 and the calling device 70 can perform wireless communication with each other through the AP 6 or without through the AP 6. That is, the multifunctional device 10 and the calling device 70 can execute the infrastructure wireless communication or ad hoc wireless communication. Meanwhile, in this illustrative embodiment, the wireless communication is performed based on standards of IEEE (The Institute of Electrical and Electronics Engineers, Inc.) 802.11 standards and standards (for example, 802.11a, 11b and the like) acting on the 802.11 standards. Therefore, wireless settings IWS, RWS, DWS1, DWS2 that will be described later are wireless settings appropriate for the above standards.

(Configuration of Multifunctional Device 10)

The multifunctional device 10 (which may be also referred to as a 'base unit') has an operation unit 12, a display unit 14, a print execution unit 16, a scan execution unit 18, a wireless interface 20 (in the below, an interface is referred to as 'I/F') and a control unit 30. The operation unit 12 has a plurality of keys. A user can input a variety of instructions to the multifunctional device 10 by operating the operation unit 12. The display unit 14 is a display for displaying a variety of information. The print execution unit 16 is a print mechanism such as inkjet type and laser type. The scan execution unit 18 is a scan mechanism such as CCD and CIS. The wireless I/F 20 is an interface for performing wireless communication.

The control unit 30 has a CPU 32, an NVRAM (non-volatile memory) and a VRAM (volatile memory) 40. The CPU 32 executes a variety of processing in response to programs stored in a ROM (not shown) of the multifunctional device 10. The CPU 32 executes the processing in response to the programs, so that respective functions of a confirmation unit 52, a change unit 54, a communication execution unit 56 and a determination unit 58 are realized. In the meantime, the determination unit 58 has a reception unit 60.

The NVRAM 34 stores therein an initial setting IWS (Initial Wireless Setting) and a receiving setting RWS (Receiving Wireless Setting). The initial setting IWS and the receiving setting RWS are respectively wireless settings (i.e., SSID, authentication method, encryption method, password and the like) that are predetermined by a vendor of the multifunctional device 10. The initial setting IWS and the receiving setting RWS are pre-stored in the multifunctional device 10 at a shipping stage of the multifunctional device 10. The initial setting IWS and the receiving setting RWS are wireless settings of the ad hoc mode for realizing the wireless communication without through the access point 6.

In the meantime, the initial setting IWS is different from the receiving setting RWS. For example, the initial setting IWS includes SSID '001.' Compared to this, the receiving setting RWS includes SSID '001-RECV.' That is, the SSID '001-RECV' included in the receiving setting RWS is an addition of a preset character string '-RECV' to the SSID '001' included in the initial setting IWS.

The VRAM 40 has a wireless setting work area 42. The wireless setting work area 42 is a storage area for storing a current wireless setting of the multifunctional device 10 (that is, a wireless setting that the multifunctional device 10 should currently use). When a power supply of the multifunctional device 10 becomes first ON after the shipping of the multifunctional device 10, the initial setting IWS is stored in the wireless setting work area 42.

In the meantime, when a user wants to use a wireless setting different from the initial setting IWS of the multifunctional device 10, the user can operate the operation unit 12 of the multifunctional device 10 to thus designate a wireless setting (i.e., SSID, authentication method, encryption method, password and the like) that the multifunctional device 10 should use. In the below, the wireless setting of the multifunctional device 10 that is designated by the user is referred to as a 'designated setting DWS (Designated Wireless Setting) 1'. In the meantime, when the multifunctional device 10 is connected in communication with the PC 4 by a wire such as USB cable, the user may operate the operation unit of the PC 4 to thus designate the designated setting DWS1. Meanwhile, in this illustrative embodiment, the designated setting DWS1 is an infrastructure wireless setting for realizing the wireless communication through the access point 6. In the meantime, the designated setting DWS1 includes SSID '002' different from the initial setting IWS and the receiving setting RWS.

For example, when the user designates the designated setting DWS1 at a state where the initial setting IWS is stored in the wireless setting work area 42, the designated setting DWS1 is stored in the wireless setting work area 42, instead of the initial setting IWS. In the meantime, at this time, the designated setting DWS1 is also stored in the NVRAM 34 so that the designated setting DWS1 is not erased even when the power supply of the multifunctional device 10 becomes OFF. Also, for example, when a condition (which will be described later) is satisfied at a state where the designated setting DWS1 is stored in the wireless setting work area 42, the receiving setting RWS or initial setting IWS is stored in the wireless setting work area 42, instead of the designated setting DWS1. This will be specifically described later.

(Configuration of Calling Device 70)

The calling device 70 (which may be also referred to as an 'extension unit') is not shipped alone and is shipped together with the multifunctional device 10. That is, the calling device 70 is an ancillary device to the multifunctional device 10. The calling device 70 has a microphone 72, a speaker 74, a PSTN I/F 76, a wireless I/F 78 and a control unit 80. Since the calling device 70 has the microphone 72 and the speaker 74, a user can perform calling communication through a PSTN (Public Switched Telephone Network) 8, which is a general public line network, by using the calling device 70. The PSTN I/F 76 is connected to the PSTN 8. Specifically, the PSTN I/F 76 is connected with one end of a PSTN cable. The other end of the PSTN cable is connected to a domestic socket for PSTN, for example. The wireless I/F 78 is an interface for performing wireless communication.

The control unit 80 has a CPU 82, an NVRAM 84 and a VRAM 90. The CPU 82 executes a variety of processing in response to programs stored in a ROM (not shown) of the calling device 70. The CPU 82 executes the processing in response to the programs, so that respective functions of a confirmation unit 102, a change unit 104, a communication execution unit 106 and an information transmission unit 108 are realized.

The NVRAM 84 stores therein an initial setting IWS and a receiving setting RWS. They are the same as the initial setting IWS and receiving setting RWS stored in the NVRAM 34 of the multifunctional device 10. The initial setting IWS and the receiving setting RWS are pre-stored in the calling device 70 at a shipping stage of the calling device 70 (i.e., at a shipping stage of the multifunctional device 10).

The VRAM 90 has a wireless setting work area 92. The wireless setting work area 92 is a storage area for storing a current wireless setting (that is, a wireless setting that the calling device 70 should currently use) of the calling device 70. When a power supply of the calling device 70 becomes first ON after the shipping of the calling device 70 together with the multifunctional device 10, the initial setting IWS is stored in the wireless setting work area 92. Like this, since the same initial setting IWS is stored in the wireless setting work areas 42, 92 at the shipping stage, the multifunctional device 10 and the calling device 70 can perform wireless communication of the ad hoc mode.

When a user wants to use a wireless setting different from the initial setting IWS of the calling device 70, the user can operate the operation unit 12 of the multifunctional device 10 to thus designate a wireless setting (i.e., SSID, authentication method, encryption method, password and the like) that the calling device 70 should use. In the below, the wireless setting of the calling device 70 that is designated by the user is referred to as a 'designated setting DWS1'. When the designated setting DWS2 for the calling device 70 is designated, the multifunctional device 10 wirelessly transmits the designated setting DWS2 to the calling device 70 by using the current wireless setting (for example, initial setting IWS) of the multifunctional device 10. Thereby, the calling device 70 can acquire the designated setting DWS2 and can store the designated setting DWS2 in the wireless setting work area 92, instead of the initial setting IWS. In the meantime, at this time, the designated setting DWS2 is also stored in the NVRAM 84 so that the designated setting DWS2 is not erased even when the power supply of the calling device 70 becomes OFF. Meanwhile, when a condition (which will be described later) is satisfied, the receiving setting RWS or initial setting IWS is stored in the wireless setting work area 92, instead of the designated setting DWS2. This will be specifically described later.

(FAX Function)

The multifunctional device 10 and the calling device 70 cooperate with each other to thus execute the processing, so that a FAX function is realized. For example, when FAX data is received through the PSTN interface 76, the calling device 70 wirelessly transmits the FAX data to the multifunctional device 10. When the FAX data is received by the wireless I/F 20, the multifunctional device 10 enables the print execution unit 16 to print an image indicated by the FAX data. Thereby, a FAX receiving operation is executed.

Also, the multifunctional device 10 wirelessly transmits the FAX data, which is generated as the scan execution unit 18 scans a document, to the calling device 70. When the FAX data is received by the wireless I/F 78, the calling device 70 transmits the FAX data through the PSTN 8 toward a transmission destination pre-designated by the user. Thereby, a FAX transmission operation is executed.

As described above, the calling device 70 can receive the FAX data through the PSTN 8, in place of the multifunctional device 10, and can transmit the FAX data through the PSTN 8, in place of the multifunctional device 10. Therefore, also in this point, it can be said that the calling device 70 is an ancillary device to the multifunctional device 10. Meanwhile, in this illustrative embodiment, the multifunctional device 10 prints an image indicated by the FAX data. However, in modified embodiments, the multifunctional device 10 may display an image indicated by the FAX data. That is, the multifunctional device 10 has only to output (i.e., print or display) the FAX data.

The calling device 70 is an ancillary device to the multifunctional device 10 and does not have the print execution unit 16 and the scan execution unit 18. Therefore, the calling device 70 has a smaller size, compared to the multifunctional device 10. Typically, a position of a socket for PSTN is set in home. If a configuration is adopted in which the PSTN cable should be connected to the multifunctional device 10, it is necessary to arrange the multifunctional device 10 in the vicinity of the socket for PSTN. Since the multifunctional device 10 has a relatively large size, it is difficult to arrange the multifunctional device 10 in the vicinity of the socket for PSTN in an environment where a space adjacent to the socket for PSTN is small. Regarding this, according to this illustrative embodiment, the calling device 70 having a relatively small size is provided with the PSTN I/F 76. Therefore, it is possible to easily arrange the calling device 70 in the vicinity of the socket for PSTN in the environment where a space adjacent to the socket for PSTN is small, thereby connecting the calling device 70 to the PSTN 8. Also, it is possible to freely arrange the multifunctional device 10 without the limit to the vicinity of the socket for PSTN.

Figure 2:
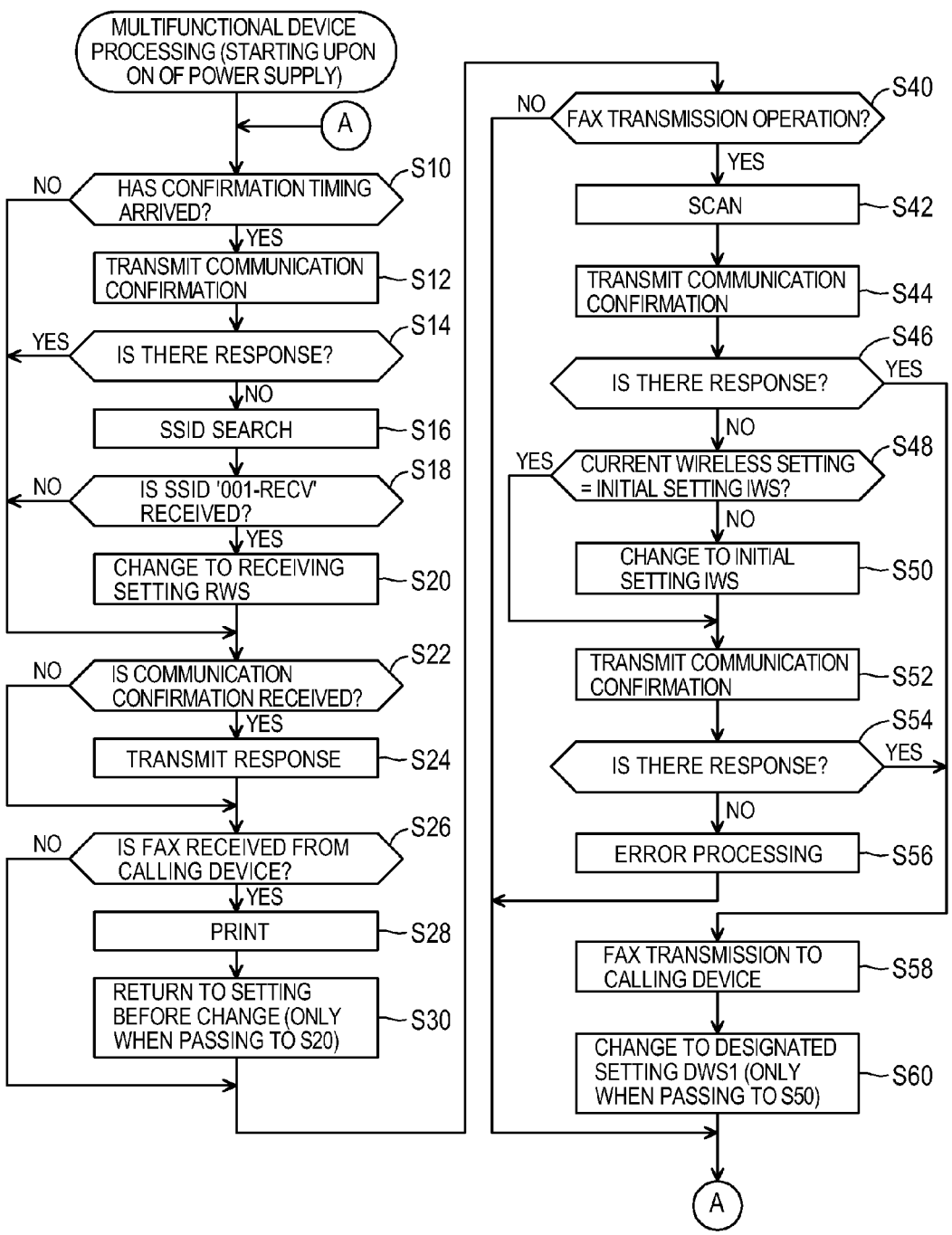
FIG. 2 shows a flowchart of a multifunctional device according to a first illustrative embodiment.

(Processing that is Executed by Multifunctional Device 10; FIG. 2)

Subsequently, the processing that is executed by the multifunctional device 10 is described with reference to a flowchart of FIG. 2. When a power supply of the multifunctional device 10 becomes ON, the control unit 30 starts the processing shown in the flowchart of FIG. 2. In the meantime, when the designated setting DWS1 is stored in the NVRAM 34 at the time that the power supply of the multifunctional device 10 becomes ON, the control unit 30 stores the designated setting DWS1 in the wireless setting work area 42. On the other hand, when the designated setting DWS1 is not stored in the NVRAM 34 (i.e., when the designated setting DWS1 is not designated yet) at the time that the power supply of the multifunctional device 10 becomes ON, the control unit 30 stores the initial setting IWS in the wireless setting work area 42.

In S10, the confirmation unit 52 (refer to FIG. 1) determines whether confirmation timing has arrived. Specifically, the control unit 30 has a confirmation timer embedded therein and resets and starts the confirmation timer when the power supply of the multifunctional device 10 becomes ON. When a value of the confirmation timer is a predetermined value (for example, 5 minutes) or smaller, the confirmation unit 52 determines that the confirmation timing has not arrived (NO in S10) and the control unit proceeds to S22. On the other hand, when a value of the confirmation timer is larger than a predetermined value, the confirmation unit 52 determines that the confirmation timing has arrived (YES in S10) and the control unit proceeds to S12.

In S12, the confirmation unit 52 transmits a communication confirmation by using the current wireless setting (i.e., the initial setting IWS or designated setting DWS1) of the multifunctional device 10 stored in the wireless setting work area 42. In the meantime, although not shown in the flowchart, the control unit 30 resets and starts the confirmation timer after the transmission of the communication confirmation.

Then, in S14, the confirmation unit 52 determines whether a response to the communication confirmation is received. That is, the confirmation unit 52 confirms whether it is possible to perform communication with the calling device 70 by using the current wireless setting of the multifunctional device 10. When a response is received within a predetermined time period after the transmission of the communication confirmation in S12, the confirmation unit 52 confirms that it is possible to perform communication with the calling device 70 (YES in S14), and the control unit skips S16 to S20 and proceeds to S22. On the other hand, when a response is not received within a predetermined time period after the transmission of the communication confirmation in S12, the confirmation unit 52 confirms that it is not possible to perform communication with the calling device 70 (NO in S14) and the control unit proceeds to S16.

In S16, the reception unit 60 (refer to FIG. 1) executes an SSID search for a wireless communication device existing in the vicinity of the multifunctional device 10. Specifically, the reception unit 60 transmits a probe request. The probe request is a signal for requesting the wireless communication device to transmit the SSID, which is included in the current wireless setting of the wireless communication device having received the probe request, to the multifunctional device 10.

In the meantime, the communication confirmation transmitted in S12 is a signal that is transmitted using the wireless setting. Hence, when the same wireless setting is not set for the multifunctional device 10 and the calling device 70, the calling device 70 cannot receive the communication confirmation from the multifunctional device 10. Compared to this, since the probe request is a signal (search for the surrounding wireless communication device) that is transmitted without using the wireless setting, the calling device 70 can receive the probe request from the multifunctional device 10, irrespective of the current wireless setting of the calling device 70. That is, the calling device 70 can receive the probe request from the multifunctional device 10 even though it cannot receive the communication confirmation from the multifunctional device 10. When the probe request is received from the multifunctional device 10, the calling device 70 transmits the SSID, which is included in the current wireless setting (that is, wireless setting stored in the wireless setting work area 92) of the calling device 70, to the multifunctional device 10. Thereby, the reception unit 60 of the multifunctional device 10 receives the SSID from the calling device 70.

Then, in S18, the determination unit 58 (refer to FIG. 1) determines whether the SSID received from the calling device 70 is consistent with the SSID '001-RECV' included in the receiving setting RWS. When the two SSIDs are not consistent with each other (NO in S18), the control unit skips S20 and proceeds to S22. In the meantime, when the SSID is not received from any communication device existing in the vicinity of the multifunctional device 10, it is also determined NO in S18. On the other hand, when the two SSIDs are consistent with each other (YES in S18), the control unit proceeds to S20.

In S20, the change unit 54 (refer to FIG. 1) changes the current wireless setting (initial setting IWS or designated setting DWS1) of the multifunctional device 10 to the receiving setting RWS stored in the NVRAM 34. Like this, when it is confirmed that it is not possible to perform communication with the calling device 70 (NO in S14) and the SSID '001-RECV' included in the receiving setting RWS is received from the calling device 70 (YES in S18), the current wireless setting of the multifunctional device 10 is changed to the receiving setting RWS.

As specifically described below, the calling device 70 transmits the communication confirmation to the multifunctional device 10 (refer to S112, S144 and S152 of FIG. 3). In a situation where the multifunctional device 10 and the calling device 70 can appropriately perform wireless communication, the control unit 30 receives the communication confirmation by using the current wireless setting of the multifunctional device 10 and determines YES in S22. In this case, in S24, the control unit 30 transmits a response to the communication confirmation by using the current wireless setting of the multifunctional device 10. When a result of the determination in S22 is NO or when the processing of S24 is over, the control unit proceeds to S26.

As specifically described below, the calling device 70 transmits the FAX data (in the below, referred to as 'FAX data of a print target') received from the PSTN 8 to the multifunctional device 10 (refer to S158 of FIG. 3). In a situation where the multifunctional device 10 and the calling device 70 can appropriately perform wireless communication, the communication execution unit 56 (refer to FIG. 1) receives the FAX data of a print target by using the current wireless setting of the multifunctional device 10 and determines YES in S26. In this case, in S28, the control unit 30 enables the print execution unit 16 to print an image indicated by the FAX data of a print target.

In the meantime, when the processing of S20 is executed and the current wireless setting of the multifunctional device 10 is thus changed to the receiving setting RWS, the change unit 54 changes the current wireless setting of the multifunctional device 10 from the receiving setting RWS to the wireless setting before the change (initial setting IWS or designated setting DWS1), in S30. When a result of the determination in S26 is NO or when the processing of S30 is over, the control unit proceeds to S40.

In S40, the control unit 30 determines whether a FAX transmission operation (i.e., an operation for designating a transmission destination and an operation of a scan execution button) is made for the operation unit 12 of the multifunctional device 10. When the FAX transmission operation is not made (NO in S40), the control unit returns to S10. When the FAX transmission operation is made (YES in S40), the control unit proceeds to S42. In S42, the control unit 30 enables the scan execution unit 18 to scan a document. Thereby, FAX data (in the below, referred to as 'FAX data of a transmission target') that should be transmitted through the PSTN 8 is generated.

Then, in S44, the confirmation unit 52 transmits the communication confirmation to the calling device 70 by using the current wireless setting of the multifunctional device 10. Then, in S46, the confirmation unit 52 determines whether a response to the communication confirmation is received, like S14. When it is confirmed that it is possible to perform communication with the calling device 70 (YES in S46), the control unit proceeds to S58. When it is confirmed that it is not possible to perform communication with the calling device 70 (NO in S46), the control unit proceeds to S48.

In S48, the change unit 54 determines whether the current wireless setting of the multifunctional device 10 is the initial setting IWS or not. When the current wireless setting of the multifunctional device 10 is the initial setting IWS (YES in S48), the control unit skips S50 and proceeds to S52. On the other hand, when the current wireless setting of the multifunctional device 10 is not the initial setting IWS, i.e., when the current wireless setting of the multifunctional device 10 is the designated setting DWS1 (NO in S48), the control unit proceeds to S50. In S50, the change unit 54 changes the current wireless setting of the multifunctional device 10 from the designated setting DWS1 to the initial setting IWS. Like this, when it is confirmed that it is not possible to perform communication with the calling device 70 (NO in S46) and there is the FAX data of a transmission target, the wireless setting of the multifunctional device 10 is changed from the designated setting DWS1 to the initial setting IWS.

Then, in S52, the confirmation unit 52 transmits the communication confirmation by using the current wireless setting (i.e., initial setting IWS) of the multifunctional device 10. Then, in S54, the confirmation unit 52 confirms whether a response to the communication confirmation is received, like S14. When it is confirmed that it is possible to perform communication with the calling device 70 (YES in S54), the control unit proceeds to S58. When it is confirmed that it is not possible to perform communication with the calling device 70 (NO in S54), the control unit proceeds to S56. In S56, the control unit 30 executes error processing. Specifically, the control unit 30 displays information, which indicates that the transmission of the FAX data through the PSTN 8 cannot be executed, on the display unit 14. When the processing of S56 is over, the control unit returns to S10.

In S58, the communication execution unit 56 (refer to FIG. 1) transmits the FAX data of a transmission target, which is generated in S42, to the calling device 70 by using the current wireless setting of the multifunctional device 10. In the meantime, when the processing of S50 is executed and the current wireless setting of the multifunctional device 10 is thus the initial setting IWS, the change unit 54 changes the current wireless setting of the multifunctional device 10 from the initial setting IWS to the designated setting DWS1, in S60. When the processing of S60 is over, the control unit returns to S10.

(Processing that is Executed by Calling Device 70; FIG. 3)

Subsequently, the processing that is executed by the calling device 70 is described with reference to a flowchart of FIG. 3. When a power supply of the calling device 70 becomes ON, the control unit 80 starts the processing shown in the flowchart of FIG. 3. In the meantime, when the designated setting DWS2 is stored in the NVRAM 84 at the time that the power supply of the calling device 70 becomes ON, the control unit 80 stores the designated setting DWS2 in the wireless setting work area 92. On the other hand, when the designated setting DWS2 is not stored in the NVRAM 84 at the time that the power supply of the calling device 70 becomes ON, the control unit 80 stores the initial setting IWS in the wireless setting work area 92.

Figure 3:
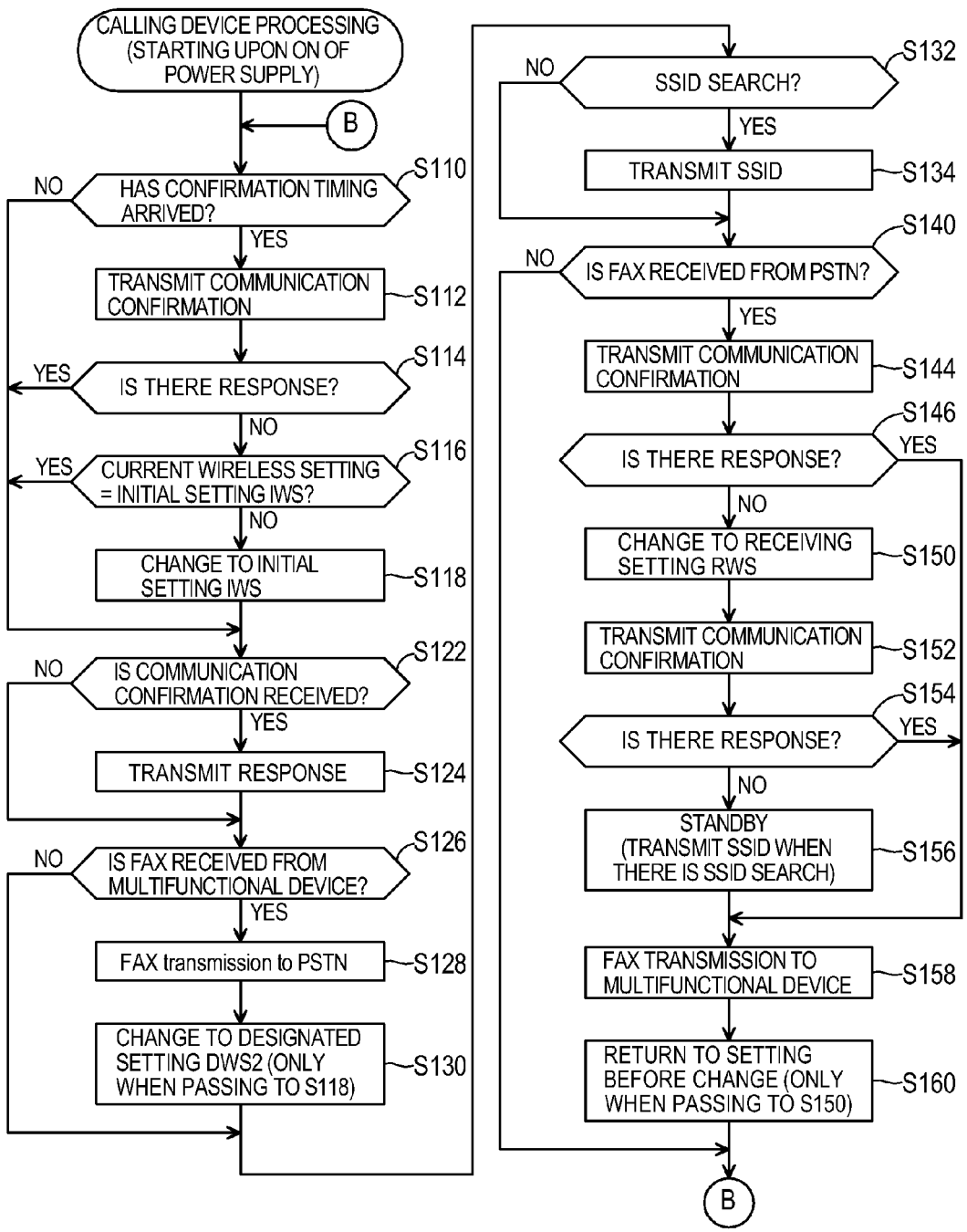
FIG. 3 shows a flowchart of a calling device according to a first illustrative embodiment.

In the meantime, the processing of S110 to S160 in FIG. 3 includes the same processing as that of S10 to S60 of FIG. 2. Hence, the processing of S110 to S160 will be briefly described in the below. The specific contents of the processing of S110 to S160 in FIG. 3 can be easily understood with reference to the processing of S10 to S60 of FIG. 2.

When it is confirmed in S110 that the confirmation timing has arrived (YES in S110), the confirmation unit 102 transmits a communication confirmation by using the current wireless setting (i.e., the initial setting IWS or designated setting DWS2) of the calling device 70, in S112. In this case, in S114, the confirmation unit 102 determines whether a response to the communication confirmation is received. When it is confirmed that it is not possible to perform communication with the multifunctional device 10 (NO in S114), the change unit 104 (refer to FIG. 1) determines whether the current wireless setting of the calling device 70 is the initial setting IWS, in S116. When the current wireless setting of the calling device 70 is not the initial setting IWS, i.e., when the current wireless setting of the calling device 70 is the designated setting DWS2 (NO in S116), the change unit 104 changes the current wireless setting of the calling device 70 from the designated setting DWS2 to the initial setting IWS, in S118. Like this, when it is confirmed that it is not possible to perform communication with the multifunctional device 10 (NO in S114) and the current wireless setting of the calling device 70 is the designated setting DWS2 (NO in S116), the wireless setting of the calling device 70 is changed from the designated setting DWS2 to the initial setting IWS.

When the communication confirmation is received from the calling device 70 by using the current wireless setting of the calling device 70, the control unit 80 determines YES in S122. In this case, the control unit 80 transmits a response to the communication confirmation by using the current wireless setting of the calling device 70, in S124.

When the FAX data of a transmission target is received from the multifunctional device 10 by using the current wireless setting of the calling device 70, the communication execution unit 106 (refer to FIG. 1) determines YES in S126. Meanwhile, in S126, the communication execution unit 106 also receives the transmission destination (i.e., FAX identification information (for example, FAX number)) designated by the user. Then, in S128, the control unit 80 calls the transmission destination received from the multifunctional device 10 by using the PSTN I/F 76. Thereby, a call is made between the calling device 70 and the transmission destination. Then, the control unit 80 transmits the FAX data of a transmission target through the PSTN 8. In the meantime, when the processing of S118 is executed and thus the current wireless setting of the calling device 70 is the initial setting IWS, the change unit 108 changes the current wireless setting of the calling device 70 from the initial setting IWS to the designated setting DWS2, in S130.

When the probe request is received from the multifunctional device 10, the control unit 80 determines YES in S132. In this case, in S134, the control unit 80 transmits the SSID, which is included in the current wireless setting of the calling device 70, to the multifunctional device 10.

When the FAX data of a transmission target is received through the PSTN I/F 76, the control unit 80 determines YES in S140. In this case, in S144, the confirmation unit 102 transmits the communication confirmation to the multifunctional device 10 by using the current wireless setting of the calling device 70. Then, in S146, the confirmation unit 102 determines whether a response to the communication confirmation is received. When it is confirmed that it is not possible to perform communication with the multifunctional device 10 (NO in S146), the control unit proceeds to S150. When it is confirmed that it is possible to perform communication with the multifunctional device 10 (YES in S146), the control unit proceeds to S158.

In S150, the change unit 104 changes the current wireless setting (initial setting IWS or designated setting DWS2) of the calling device 70 to the receiving setting RWS. Like this, when it is confirmed that it is not possible to perform communication with the multifunctional device 10 (NO in S146) and there is the FAX data of a print target, the wireless setting of the calling device 70 is changed to the receiving setting RWS.

Then, in S152, the confirmation unit 102 transmits the communication confirmation by using the current wireless setting (i.e., receiving setting RWS) of the calling device 70. Then, in S154, the confirmation unit 102 determines whether a response to the communication confirmation is received. When it is confirmed that it is not possible to perform communication with the multifunctional device 10 (NO in S154), the control unit proceeds to S156. When it is confirmed that it is possible to perform communication with the multifunctional device 10 (YES in S154), the control unit proceeds to S158.

In S156, the information transmission unit 108 (refer to FIG. 1) stands by until the probe request is received from the multifunctional device 10. When the probe request is received from the multifunctional device 10, the information transmission unit 108 transmits the SSID '001-RECV', which is included in the receiving setting RWS that is the current wireless setting of the calling device 70, to the multifunctional device 10. In the meantime, as described above, also in S134, the SSID is transmitted to the multifunctional device 10. However, at a stage where the processing of S134 is executed, there is no FAX data of a print target and the current wireless setting of the calling device 70 is the initial setting IWS or designated setting DWS2. Therefore, in S134, the SSID '001-RECV' included in the receiving setting RWS is not transmitted to the multifunctional device 10. That is, when there is no FAX data of a print target, the information transmission unit 108 does not transmit the SSID '001-RECV' included in the receiving setting RWS to the multifunctional device 10.

In S158, the communication execution unit 106 transmits the FAX data of a print target to the multifunctional device 10 by using the current wireless setting of the calling device 70. In the meantime, when the processing of S150 is executed and thus the current wireless setting of the calling device 70 is the receiving setting RWS, the change unit 104 changes the current wireless setting of the calling device 70 from the receiving setting RWS to the wireless setting before the change (initial setting IWS or designated setting DWS2), in S160.

(Specific Examples of First Illustrative Embodiment; FIGS. 4 to 7)

Subsequently, specific cases that are implemented by the multifunctional device 10 and the calling device 70 are described. The respective cases are implemented as the multifunctional device 10 and the calling device 70 execute the flowcharts of FIGS. 2 and 3.

(Case A)

First, a case A where the FAX data of a print target is received from the PSTN 8 is described with reference to FIGS. 4 and 5. As described above, the current wireless settings of the multifunctional device 10 and the calling device 70 are the initial settings IWS of the same ad hoc until the user designates the designated setting DWS1 and the designated setting DWS2.

Figure 4:
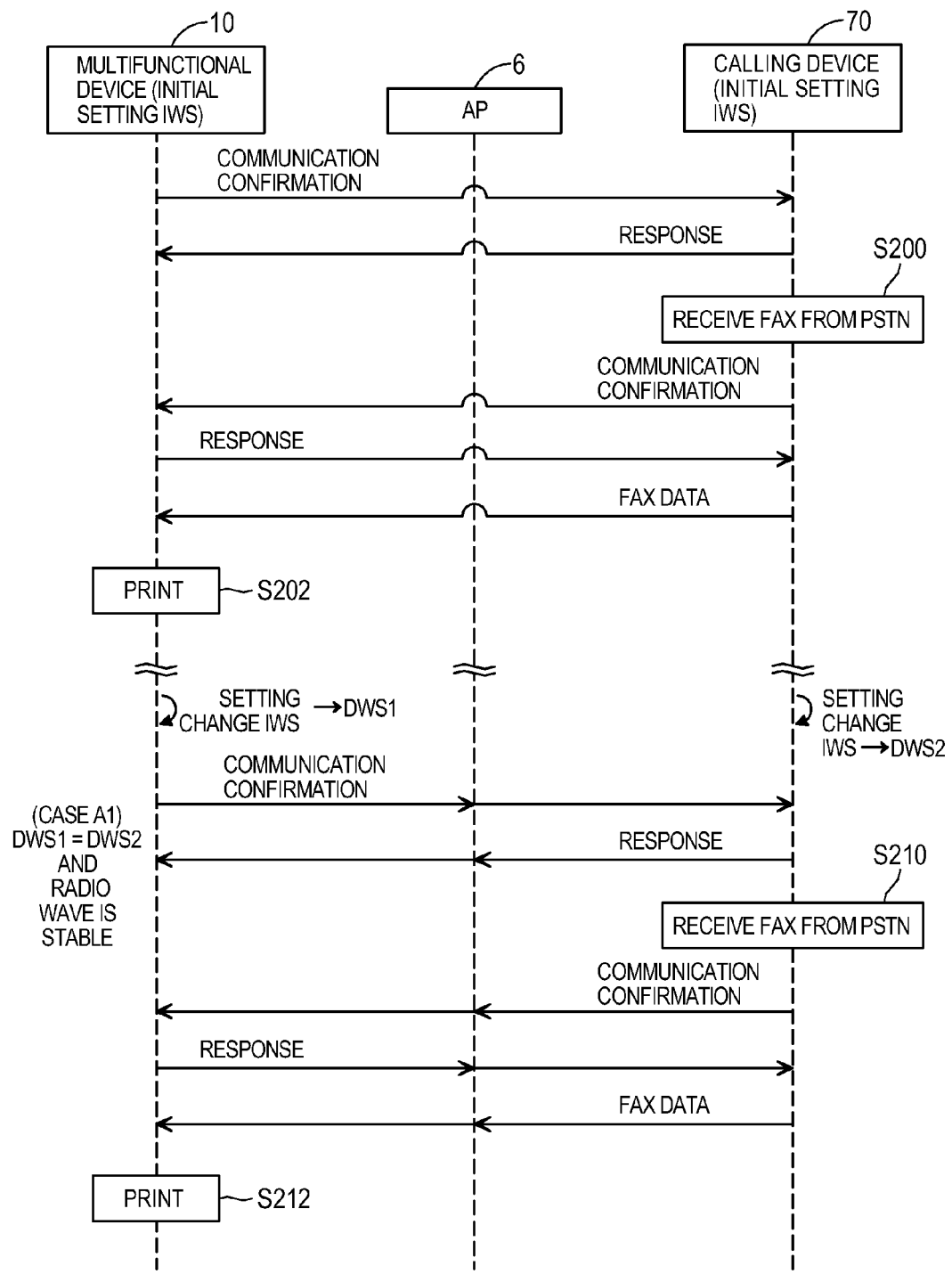
FIG. 4 shows an example where the calling device receives FAX data through the PSTN in a situation where the multifunctional device and the calling device can communicate with each other.

As shown in FIG. 4, the multifunctional device 10 transmits a communication confirmation to the calling device 70 (S12 in FIG. 2). The calling device 70 receives the communication confirmation from the multifunctional device 10 by using the initial setting IWS (YES in S122 of FIG. 3). In this case, the calling device 70 transmits a response to the communication confirmation to the multifunctional device 10 by using the initial setting IWS (S124 in FIG. 3). The multifunctional device 10 receives the response to the communication confirmation by using the initial setting IWS (YES in S14 of FIG. 2). As a result, the initial setting IWS that is the current wireless setting of the multifunctional device 10 is held.

In S200, the calling device 70 receives the FAX data of a print target from the PSTN 8 (YES in S140 of FIG. 3). In this case, the calling device 70 transmits a communication confirmation to the multifunctional device 10 by using the initial setting IWS (S144 in FIG. 3). The multifunctional device 10 receives the communication confirmation from the calling device 70 by using the initial setting IWS (YES in S22 of FIG. 2). In this case, the multifunctional device 10 transmits a response to the communication confirmation to the calling device 70 by using the initial setting IWS (S24 in FIG. 2). Thereby, the calling device 70 receives the response to the communication confirmation by using the initial setting IWS (YES in S146 of FIG. 3).

Then, the calling device 70 transmits the FAX data of a print target to the multifunctional device 10 by using the initial setting IWS (S158 in FIG. 3). The multifunctional device 10 receives the FAX data of a print target by using the initial setting IWS (YES in S26 of FIG. 2). Then, in S202, the multifunctional device 10 prints an image that is indicated by the FAX data of a print target (S28 in FIG. 2).

(Setting Change)

For example, a user may want to build a system in which the multifunctional device 10 and the PC 4 can perform wireless communication through the AP 6. In this case, the user designates the designated setting DWS1 of the infrastructure mode, as the wireless setting of the multifunctional device 10. By doing so, the multifunctional device 10 and the calling device 70 cannot perform communication because the designated setting DWS1, which is the current wireless setting of the multifunctional device 10, and the initial setting IWS, which is the current wireless setting of the calling device 70, are different from each other. Accordingly, the user further designates the designated setting DWS2 of the infrastructure mode, as the wireless setting of the calling device 70. At this time, when the user appropriately designates the same designated setting DWS2 (for example, SSID '002') as the designated setting DWS1 (for example, SSID '002'), as the wireless setting of the calling device 70, and the radio wave state is stable, a following case A1 is realized. In the meantime, the stable radio wave state means a state where the multifunctional device 10 and the AP 6 can perform communication and the calling device 70 and the AP 6 can perform communication.

Figure 5:
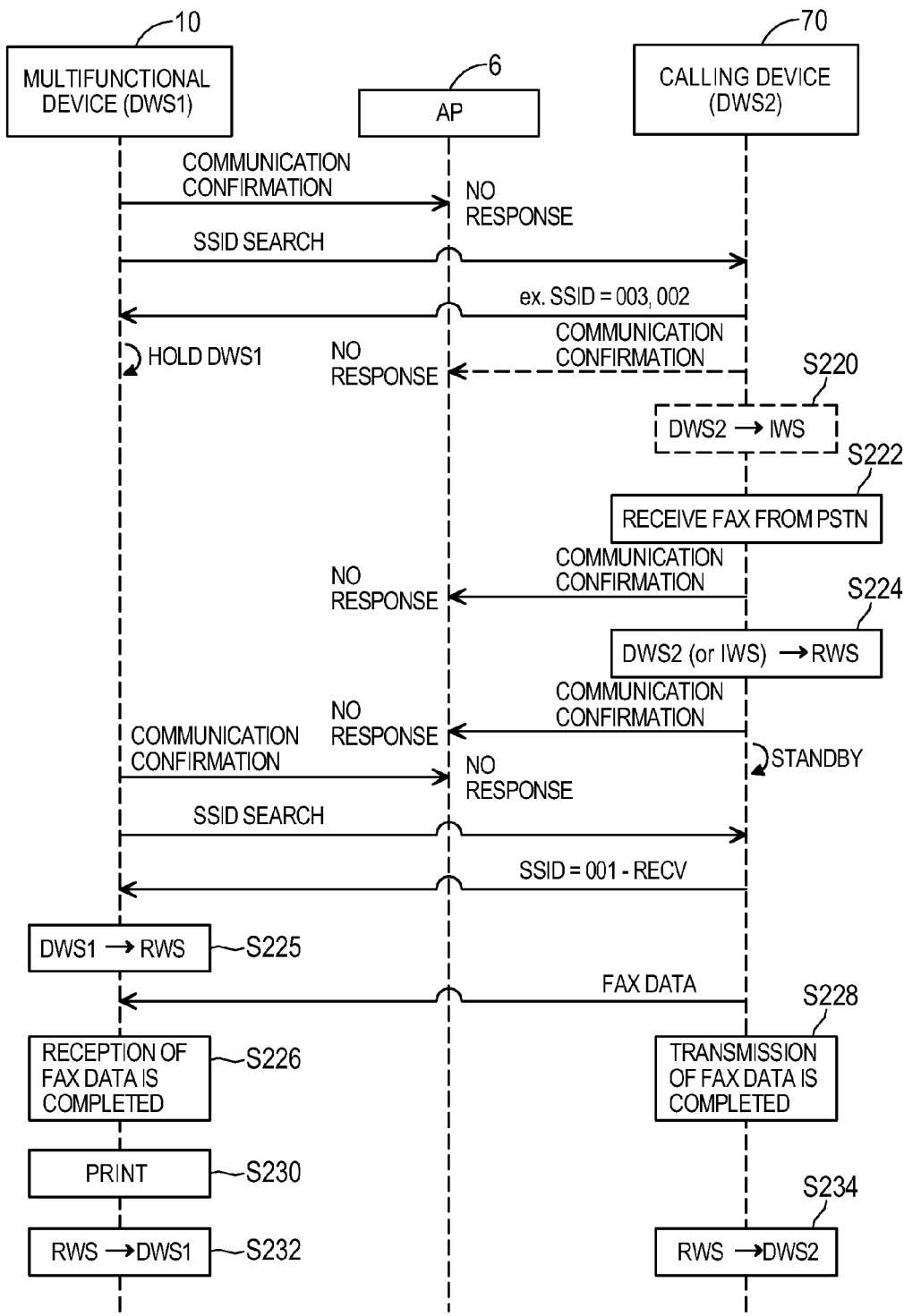
FIG. 5 shows an example where the calling device receives FAX data through the PSTN in a situation where the multifunctional device and the calling device cannot communicate with each other.

On the other hand, when the user erroneously designates the designated setting DWS2 (for example, SSID '003') different from the designated setting DWS1 (for example, SSID '002'), as the wireless setting of the calling device 70 (in the below, the case is referred to as a 'case X') or when the radio wave state is unstable (in the below, the case is referred to as a 'case Y'), a case A2 of FIG. 5 is realized. In the meantime, the unstable radio wave state means a state where the multifunctional device 10 and the AP 6 cannot perform communication because a distance between the multifunctional device 10 and the AP 6 is large or a state where the calling device 70 and the AP 6 cannot perform communication because a distance between the calling device 70 and the AP 6 is large.

(Case A1)

In a case A1, the multifunctional device 10 and the calling device 70 can appropriately perform wireless communication through the AP 6 by using the designates settings DWS1, DWS2. Therefore, the case A1 is the same as the above case where the wireless communication is performed using the initial setting IWS, except that the wireless communication is performed through the AP 6. That is, the communication confirmation, the response to the communication confirmation and the FAX data of a print target are appropriately transmitted and received between the multifunctional device 10 and the calling device 70 through the AP 6. Hence, the image that is indicated by the FAX data of a print target received from the PSTN 8 in S210 is appropriately printed in S212.

(Case A2)

As shown in FIG. 5, in a case A2, even when the multifunctional device 10 transmits the communication confirmation to the calling device 70 by using the designated setting DWS1 (S12 in FIG. 2), the multifunctional device cannot receive a response to the communication confirmation (NO in S14 of FIG. 2). In this case, the multifunctional device 10 executes the SSID search (S16 in FIG. 2). When the probe request is received (YES in S132 of FIG. 3), the calling device 70 transmits the SSID included in the designated setting DWS2 to the multifunctional device 10 (S134 in FIG. 3). Specifically, the calling device 70 transmits the SSID '003' in the case X and SSID '002' in the case Y. The multifunctional device 10 determines NO in S18 of FIG. 2 even when any of SSID '002' and SSID '003' is received, and holds the designated setting DWS1 that is the current wireless setting of the multifunctional device 10. As a result, the multifunctional device 10 can perform wireless communication with the PC 4 through the AP 6 by using the designated setting DWS1. That is, the multifunctional device 10 can receive the print data of a print target from the PC 4 and execute a print job.

Also, even when the calling device 70 transmits the communication confirmation to the multifunctional device 10 by using the designated setting DWS2 (S112 in FIG. 3), it cannot receive the response to the communication confirmation (NO in S114 of FIG. 3). In this case, in S220, the calling device 70 changes the current wireless setting of the calling device 70 from the designated setting DWS2 to the initial setting IWS (S118 in FIG. 3).

When the FAX data of a print target is received from the PSTN 8 in S222, the calling device 70 transmits the communication confirmation to the multifunctional device 10 by using the initial setting IWS changed in S220 (S144 in FIG. 3). In the meantime, the calling device 70 may receive the FAX data of a print target from the PSTN 8 before the transmission timing of the communication confirmation in S220. In this case, the calling device 70 transmits the communication confirmation to the multifunctional device 10 by using the designated setting DWS2 (S144 in FIG. 3) because it has not passed to S220. In any case, the calling device 70 cannot receive a response to the communication confirmation (NO in S146 of FIG. 3). In this case, in S224, the calling device 70 changes the current wireless setting (initial setting IWS or designated setting DWS2) of the calling device 70 to the receiving setting RWS (S150 in FIG. 3).

Then, the calling device 70 transmits the communication confirmation to the multifunctional device 10 by using the receiving setting RWS (S152 in FIG. 3). At the present time, since the current wireless setting of the multifunctional device 10 is the designated setting DWS1, the calling device 70 cannot receive the response to the communication confirmation (NO in S154). In this case, the calling device 70 stands by until the probe request is received from the multifunctional device 10 (S156 in FIG. 3).

In the meantime, even when the multifunctional device 10 transmits the communication confirmation to the calling device 70 by using the designated setting DWS1 (S12 in FIG. 2), it cannot receive a response to the communication confirmation (NO in S14 of FIG. 2). In this case, the multifunctional device 10 executes the SSID search (S16 in FIG. 2). As a result, the calling device 70 transmits the SSID '001-RECV', which is included in the receiving setting RWS that is the current wireless setting of the calling device 70, to the multifunctional device 10 (S156 in FIG. 3). Thereby, the multifunctional device 10 determines YES in S18 of FIG. 2, and changes the current wireless setting of the multifunctional device 10 from the designated setting DWS1 to the receiving setting RWS in S225 (S20 in FIG. 2).

Then, the calling device 70 transmits the FAX data of a print target to the multifunctional device 10 without through the AP6 by using the receiving setting RWS (S158 in FIG. 3). The multifunctional device 10 receives the FAX data of a print data without through the AP6 by using the receiving setting RWS (YES in S26 of FIG. 2). As a result, the transmission and reception of the FAX data of a print target are completed (S226, S228). Then, in S230, the multifunctional device 10 prints an image that is indicated by the FAX data of a print target (S28 in FIG. 2).

Then, in S232, the multifunctional device 10 changes the current wireless setting of the multifunctional device 10 from the receiving setting RWS to the designated setting DWS1 (S30 in FIG. 2). Thereby, the multifunctional device 10 can perform wireless communication with the PC 4 through the AP6 by using the designated setting DWS1. Also, in S234, the calling device 70 changes the current wireless setting of the calling device 70 from the receiving setting RWS to the wireless setting before the change (initial setting IWS or designated setting DWS2) (S160 in FIG. 3).

(Effects of Case A)

As described in the case A, the multifunctional device 10 confirms whether it is possible to perform communication with the calling device 70 by using the designated setting DWS1 that is the current wireless setting of the multifunctional device 10. When it is confirmed that it is not possible to perform communication with the calling device 70, the multifunctional device 10 executes the SSID search. When the SSID received from the calling device 70 is not consistent with the SSID included in the receiving setting RWS, the multifunctional device 10 holds the designated setting DWS1 that is the current wireless setting.

The calling device 70 confirms whether it is possible to perform communication with the multifunctional device 10 by using the designated setting DWS2 that is the current wireless setting of the calling device 70. When it is confirmed that it is not possible to perform communication with the multifunctional device 10, the calling device 70 changes the current wireless setting of the calling device 70 from the designated setting DWS2 to the initial setting IWS. Then, when it is necessary to transmit the FAX data of a print target to the multifunctional device 10, the calling device 70 changes the current wireless setting of the calling device 70 from the initial setting ISW to the receiving setting RWS. That is, when it is confirmed that it is not possible to perform communication with the multifunctional device 10, and when there is the FAX data of a print target, the calling device 70 changes the current wireless setting of the calling device 70 from the designated setting DWS2 to the receiving setting RWS via the initial setting IWS.

Then, the multifunctional device 10 executes the SSID search. When the SSID '001-RECV' is received from the calling device 70, the multifunctional device 10 changes the current wireless setting of the multifunctional device 10 from the designated setting DWS1 to the receiving setting RWS. As a result, since the same receiving setting RWS is set for the multifunctional device 10 and the calling device 70, respectively, the multifunctional device 10 and the calling device 70 can perform wireless communication of the FAX data of a print target by using the receiving setting RWS. Therefore, it is possible to suppress the situation from occurring, in which the multifunctional device 10 and the calling device 70 cannot perform wireless communication of the FAX data of a print target.

As described above, the multifunctional device 10 holds the designated setting DWS1 when there is no FAX data of a print target in a situation where it is not possible to perform wireless communication with the calling device 70 by using the designated setting DWS1. Thereby, the multifunctional device 10 can perform wireless communication with the PC 4 through the AP 6 by using the designated setting DWS1 when there is no FAX data of a print target. Therefore, it is possible to suppress the situation from occurring, in which the multifunctional device 10 cannot perform wireless communication with the PC 4. That is, according to this illustrative embodiment, the multifunctional device 10 can change the wireless setting from the designated setting DWS1 to the receiving setting RWS at appropriate timing.

Also, in this illustrative embodiment, the multifunctional device 10 can determine whether there is FAX data of a print target by using the content of the SSID received from the calling device 70. Specifically, when the SSID '001-RECV' is received from the calling device 70, the multifunctional device 10 can confirm that there is the FAX data of a print target, and when the SSID (that is, '002' or '003') other than the SSID '001-RECV' is received from the calling device 70, the multifunctional device 10 can confirm that there is no FAX data of a print target. Like this, in this illustrative embodiment, the configuration is adopted in which the multifunctional device 10 can confirm whether there is FAX data of a print target, based on the content of the SSID included in the receiving setting RWS. Therefore, the multifunctional device 10 can easily confirm whether there is FAX data of a print target by using the general wireless communication method of the probe request.

(Case B)

Figure 6:
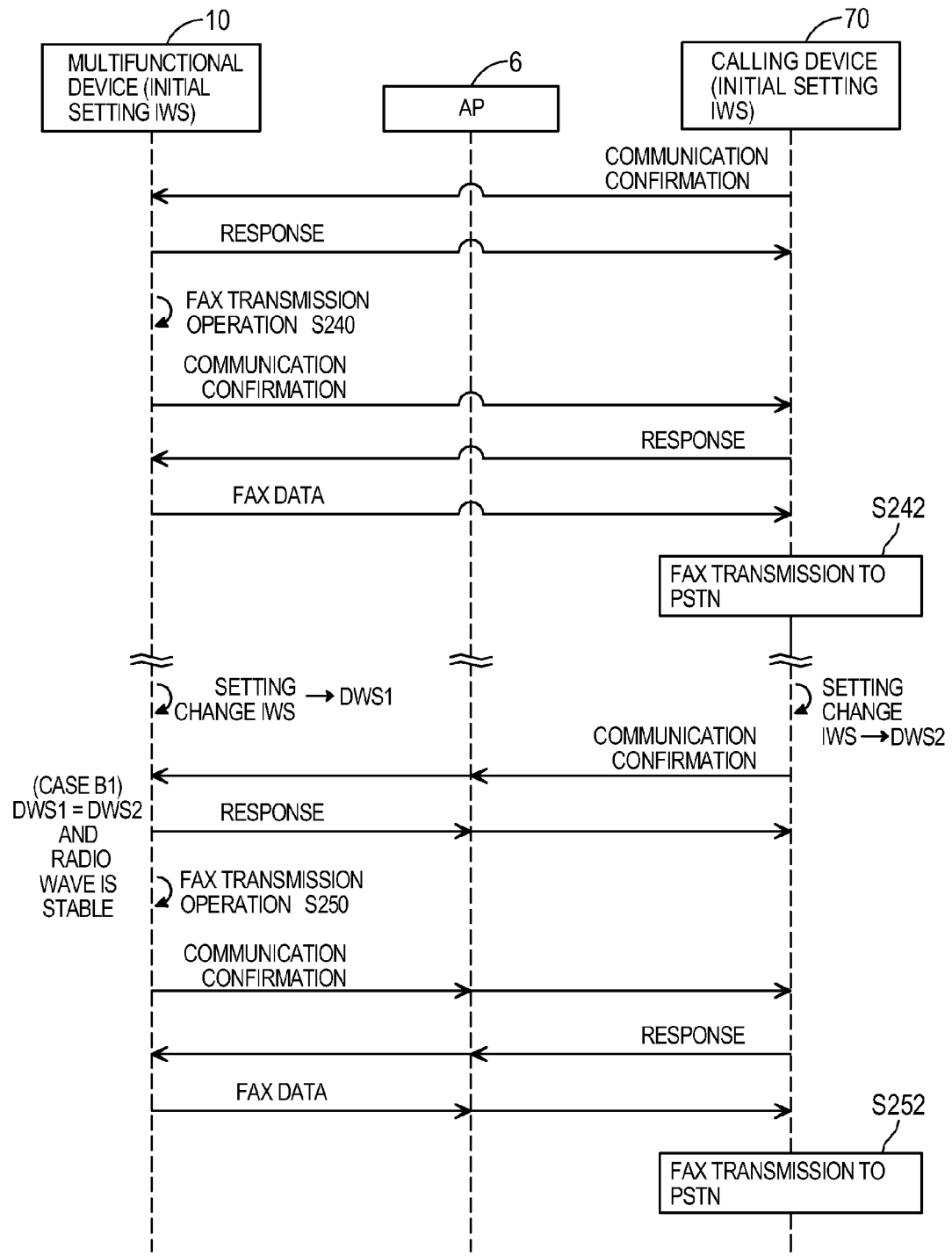
FIG. 6 shows an example where a FAX transmission operation is executed in a situation where the multifunctional device and the calling device can communicate with each other.

Subsequently, a case B is described in which the FAX data of a transmission target is transmitted through the PSTN 8 with reference to FIGS. 6 and 7. As shown in FIG. 6, the calling device 70 transmits the communication confirmation to the multifunctional device 10 by using the initial setting IWS (S112 in FIG. 3). Since the same initial setting IWS is set for the multifunctional device 10 and the calling device 70, respectively, the calling device 70 receives the response to the communication confirmation (YES in S114 of FIG. 3). As a result, the initial setting IWS, which is the current wireless setting of the calling device 70, is held.

When the FAX transmission operation is executed in S240 (YES in S240 of FIG. 2), the multifunctional device 10 transmits the communication confirmation to the calling device 70 by using the initial setting IWS (S44 in FIG. 2). Since the same initial setting IWS is set for the multifunctional device 10 and the calling device 70, respectively, the multifunctional device 10 receives the response to the communication confirmation (YES in S46 of FIG. 2).

Then, the multifunctional device 10 transmits the FAX data of a transmission target to the calling device 70 without through the AP 6 by using the initial setting IWS (S58 in FIG. 2). The calling device 70 receives the FAX data of a transmission target without through the AP 6 by using the initial setting IWS (YES in S126 of FIG. 3). Then, in S242, the calling device 70 transmits the FAX data of a transmission target through the PSTN 8 (S128 in FIG. 3).

(Setting Change)

When the user designates the designated setting DWS1, as the wireless setting of the multifunctional device 10, and appropriately designates the same designated setting DWS2 as the designated setting DWS1, as the wireless setting of the calling device 70 and the radio wave state is also stable, a following case B1 is realized. Regarding this, a case B2 of FIG. 7 is realized in the case X or case Y.

(Case B1)

In a case B1, the multifunctional device 10 and the calling device 70 can appropriately perform wireless communication through the AP 6 by using the designated settings DWS1, DWS2. Therefore, when the FAX transmission operation is executed in S250, the communication confirmation, the response to the communication confirmation and the FAX data of a transmission target are appropriately transmitted and received between the multifunctional device 10 and the calling device 70 through the AP 6. As a result, the FAX data of a transmission target is transmitted through the PSTN 8 in S252.

(Case B2)

Figure 7:
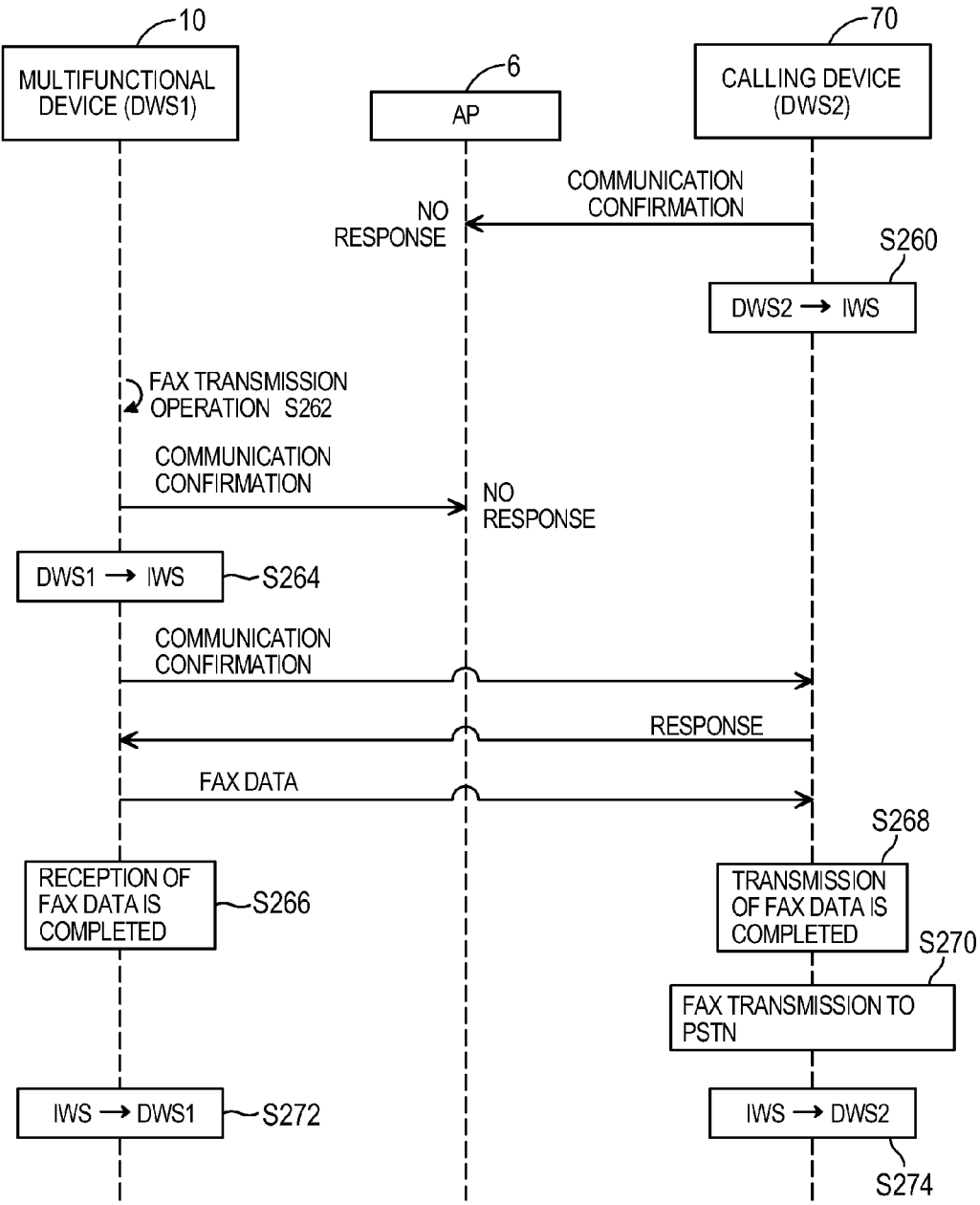
FIG. 7 shows an example where a FAX transmission operation is executed in a situation where the multifunctional device and the calling device cannot communicate with each other.

As shown in FIG. 7, in a case B2, even when the calling device 10 transmits the communication confirmation to the multifunctional device 10 by using the designated setting DWS2 (S112 in FIG. 3), the calling device cannot receive a response to the communication confirmation (NO in S114 of FIG. 3). In this case, in S260, the calling device 70 changes the current wireless setting of the calling device 70 from the designated setting DWS2 to the initial setting IWS (S118 in FIG. 3).

Even when the multifunctional device 10 transmits the communication confirmation to the calling device 70 by using the initial setting IWS (S44 in FIG. 2) upon the execution of the FAX transmission operation in S262, the multifunctional device 10 cannot receive a response to the communication confirmation (NO in S46 of FIG. 2). In this case, in S264, the multifunctional device 10 changes the current wireless setting of the multifunctional device 10 from the designated setting DWS1 to the initial setting IWS (S50 in FIG. 2). Then, the multifunctional device 10 transmits the communication confirmation to the calling device 70 by using the initial setting IWS (S52 in FIG. 2). Since the same initial setting IWS is set for the multifunctional device 10 and the calling device 70, respectively, the multifunctional device 10 receives a response to the communication confirmation (YES in S54 of FIG. 2).

Then, the multifunctional device 10 wirelessly transmits the FAX data of a transmission target to the calling device 70 without through the AP 6 by using the initial setting IWS (S58 in FIG. 2). The calling device 70 receives the FAX data of a transmission target without through the AP 6 by using the initial setting IWS (YES in S136 of FIG. 3). As a result, the transmission and reception of the FAX data of a transmission target are completed (S266, S268). Then, in S270, the calling device 70 transmits the FAX data of a transmission target through the PSTN 8 (S128 in FIG. 3).

Then, in S272, the multifunctional device 10 changes the current wireless setting of the multifunctional device 10 from the initial setting IWS to the designated setting DWS1 (S60 in FIG. 2). Thereby, the multifunctional device 10 can again perform wireless communication with the PC 4 through the AP 6 by using the designated setting DWS1. Also, in S274, the calling device 70 changes the current wireless setting of the calling device 70 from the initial setting IWS to the designated setting DWS2 (S130 in FIG. 3).

(Effects of Case B)

As described in the case B2, when it is confirmed that it is not possible to perform communication with the multifunctional device 10, the calling device 70 changes the current wireless setting from the designated setting DWS2 to the initial setting IWS. Also, when it is confirmed that it is not possible to perform communication with the calling device 70 at the time that it is necessary to transmit the FAX data of a transmission target to the calling device 70 (YES in S40 of FIG. 2), the multifunctional device 10 changes the current wireless setting from the designated setting DWS1 to the initial setting IWS. As a result, the multifunctional device 10 and the calling device 70 can perform wireless communication of the FAX data of a transmission target by using the same initial setting IWS. Therefore, it is possible to suppress the situation from occurring, in which the multifunctional device 10 and the calling device 70 cannot perform wireless communication of the FAX data of a transmission target.

Second Illustrative Embodiment

The things that are different from the first illustrative embodiment are described. The NVRAM 34 of the multifunctional device 10 stores the initial setting IWS and the designated setting DWS1 (not shown) without storing the receiving setting RWS. Likewise, the NVRAM 84 of the calling device 70 stores the initial setting IWS and the designated setting DWS2 (not shown) without storing the receiving setting RWS.

Figure 8:
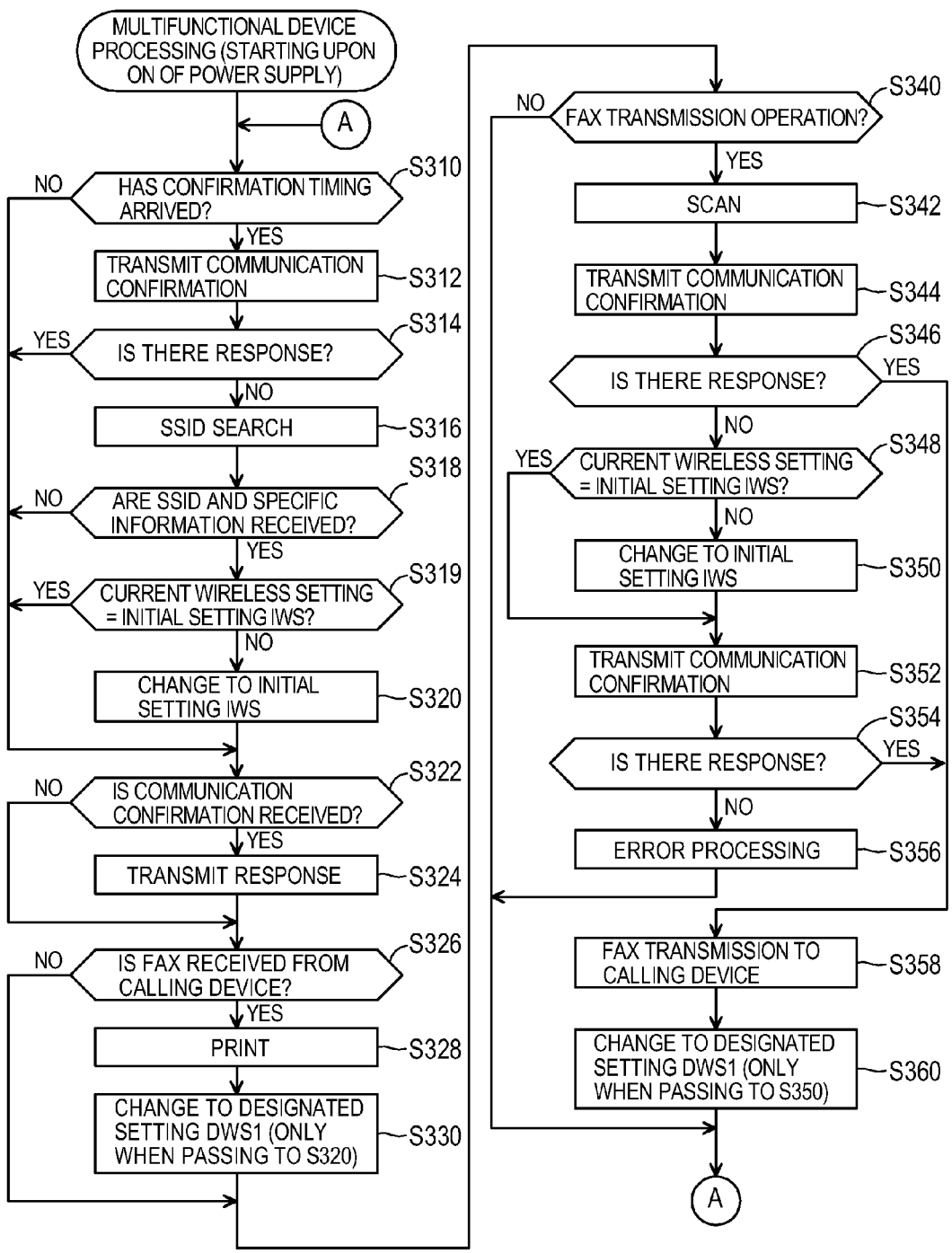
FIG. 8 shows a flowchart of a multifunctional device according to a second illustrative embodiment.

(Processing that is Executed by Multifunctional Device 10; FIG. 8)

In this illustrative embodiment, the multifunctional device processing of FIG. 8 is executed instead of the multifunctional device processing of FIG. 2. The processing of S310 to S316 is the same as that of S10 to S16 of FIG. 2. In S318, the determination unit 58 determines whether the specific information (for example, predetermined character string) is received from the calling device 70 together with the SSID included in the current wireless setting of the calling device 70. When a result of the determination is YES, the change unit 54 determines in S319 whether the current wireless setting of the multifunctional device 10 is the initial setting IWS. When a result of the determination is NO, the change unit 54 changes the current wireless setting of the multifunctional device 10 from the designated setting DWS1 to the initial setting IWS in S320. In the meantime, the processing of S322 to S360 is the same as that of S22 to S60 in FIG. 2.

Figure 9:
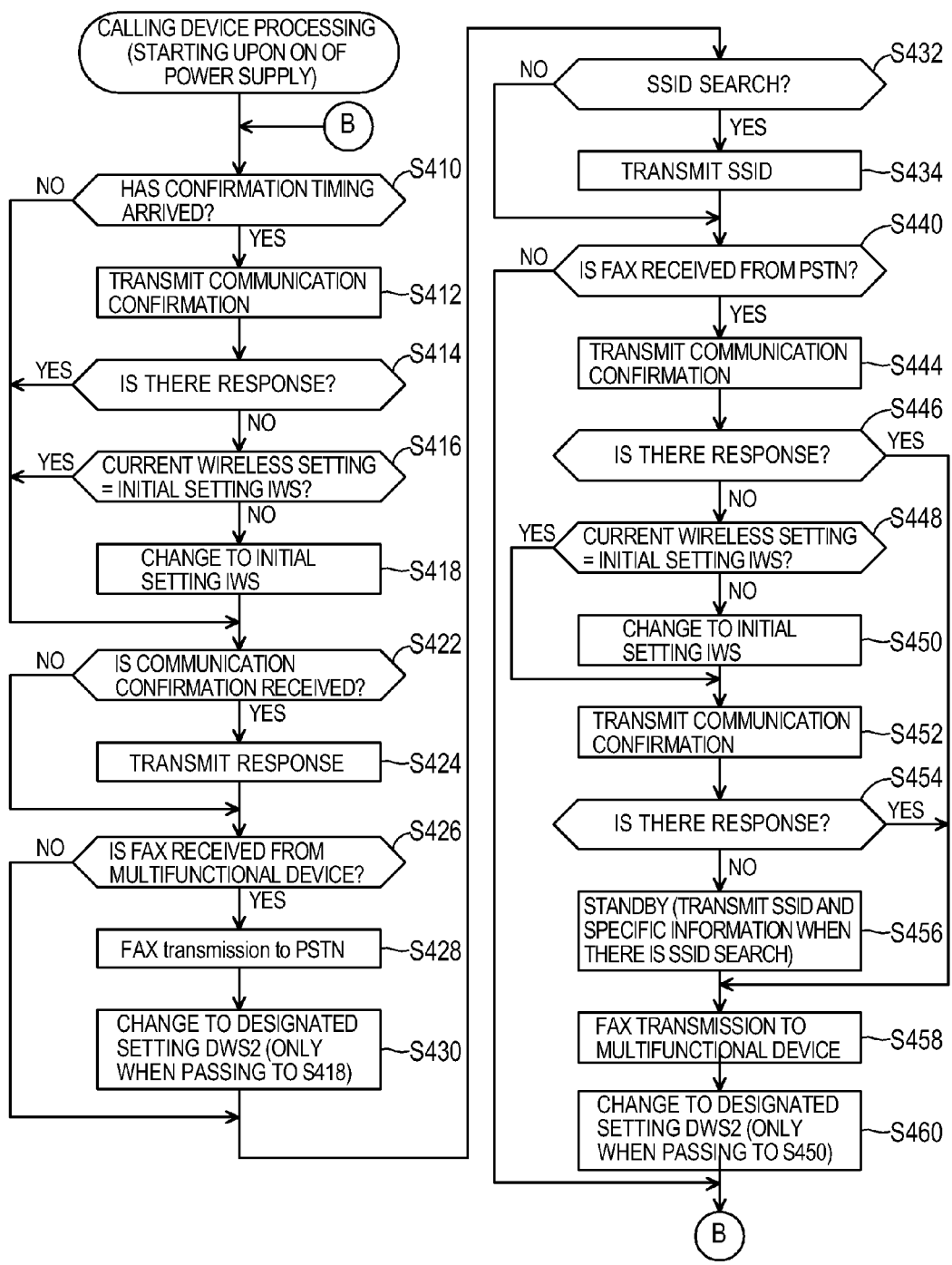
FIG. 9 shows a flowchart of a calling device according to a second illustrative embodiment.

(Processing that is Executed by Calling Device 70; FIG. 9)

In this illustrative embodiment, the calling device processing of FIG. 9 is executed instead of the calling device processing of FIG. 3. The processing of S410 to S446 is the same as that of S110 to S146 of FIG. 3. When a result of the determination in S446 is NO, the change unit 104 determines in S448 whether the current wireless setting of the calling device 70 is the initial setting IWS. When a result of the determination is NO, the change unit 104 changes the current wireless setting of the calling device 70 from the designated setting DWS2 to the initial setting IWS in S450. The processing of S452 to S454 is the same as that of S152 to S154 in FIG. 3.

In S456, when the probe request is received from the multifunction device 10, the information transmission unit 108 transmits the preset specific information (for example, predetermined character string) to the multifunctional device 10 together with the SSID '001' included in the initial setting IWS that is the current wireless setting of the calling device 70. In the meantime, when the probe request is received from the multifunction device 10 in S432, the information transmission unit 108 transmits the SSID included in the current wireless setting of the calling device 70 to the multifunctional device 10 but does not transmit the specific information to the multifunctional device 10. In the meantime, the processing of S458 to S460 is the same as that of S158 to S160 in FIG. 3.

Figure 10:
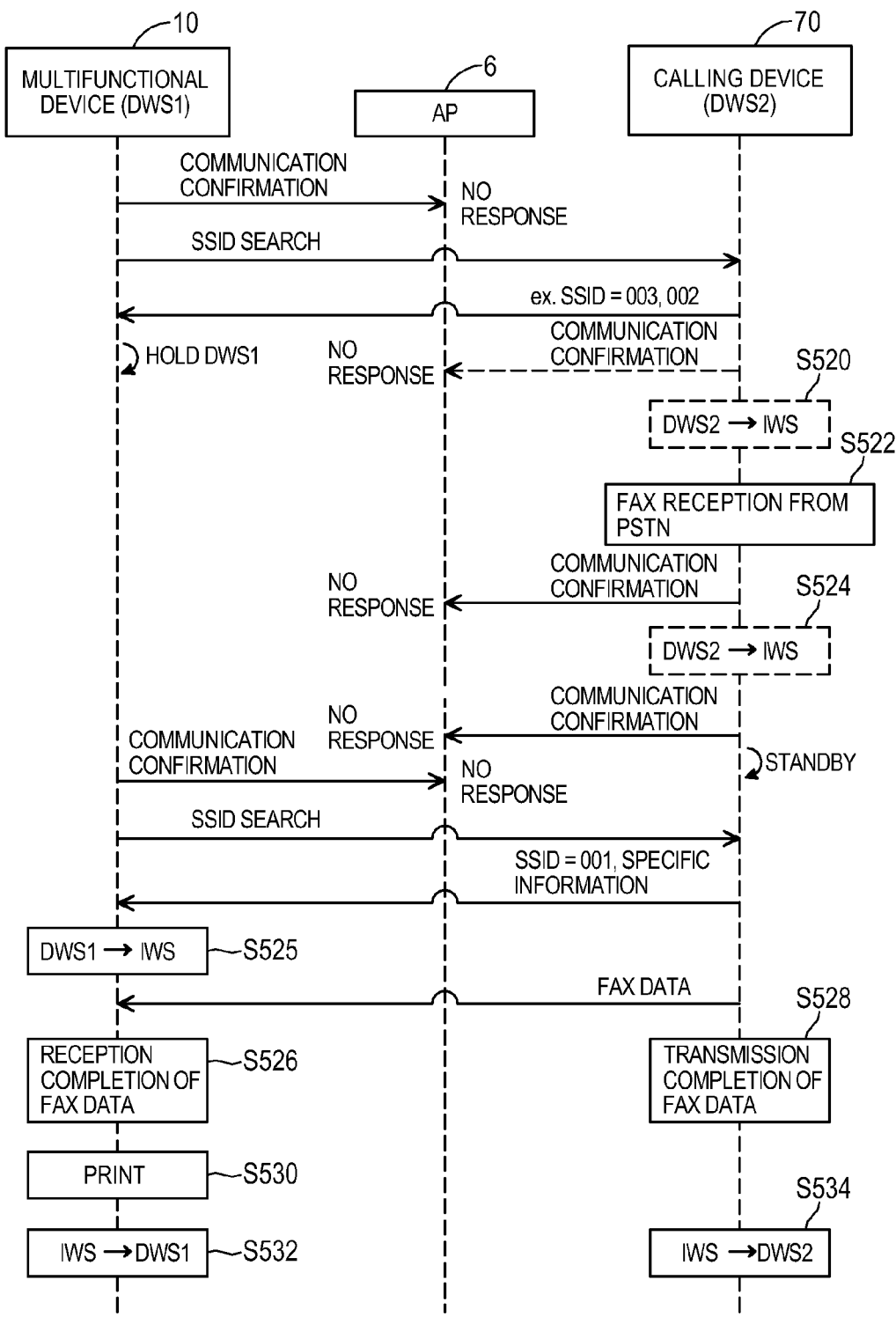
FIG. 10 shows an example where the calling device receives FAX data through the PSTN in a situation where the multifunctional device and the calling device cannot communicate with each other.

(Specific Example of Second Illustrative Embodiment; FIG. 10)

Also in this illustrative embodiment, the cases A, A1, B, B1 and B2 of the first illustrative embodiment are realized. In this illustrative embodiment, a case A2" of FIG. 10 is realized instead of the case A2 of the first illustrative embodiment. The processing is the same as FIG. 5, up to the processing in which the multifunctional device 10 executes the first SSID search. In this case, the calling device 70 transmits the SSIC (that is, SSID '003' for the case X and SSID '002' for the case Y) included in the designated setting DWS2 to the multifunctional device 10 (S434 in FIG. 9). In this case, however, the calling device 70 does not transmit the specific information to the multifunctional device 10.

The calling device 70 does not receive a response from the multifunctional device 10 (NO in S414 of FIG. 9) even though it transmits the communication confirmation to the multifunctional device 10 (S412 in FIG. 9). Thus, in S520, the calling device 70 changes the current wireless setting of the calling device 70 from the designated setting DWS2 to the initial setting IWS (S418 in FIG. 9). In the meantime, like the first illustrative embodiment, when the calling device 70 receives the FAX data of a print target from the PSTN 8 in S522 (YES in S440 of FIG. 9) before the transmission timing of the communication confirmation in S520, the calling device 70 changes the current wireless setting of the calling device 70 from the designated setting DWS2 to the initial setting IWS in S524 (S450 in FIG. 9).

After that, when the probe request is received from the multifunctional device 10, the calling device 70 transmits the SSID '001' included in the initial setting IWS and the specific information to the multifunctional device 10 (S456 in FIG. 9). As a result, in S525, the multifunctional device 10 changes the current wireless setting of the multifunctional device 10 from the designated setting DWS1 to the initial setting IWS (S320 in FIG. 8). The processing thereafter (i.e., transmission and print processing of the FAX data of a print target (S526, S528) and processing of returning the wireless setting to the setting before the change (S532, S534)) is the same as FIG. 5.

(Effects of Case A")

In this illustrative embodiment, when there is the FAX data of a print target in the situation where it is not possible to perform wireless communicating by using the designated settings DWS1, DWS2, the multifunctional device 10 and the calling device 70 change the wireless setting from the designated setting DWS1, DWS2 to the initial setting IWS. As a result, it is possible to suppress the situation from occurring, in which the multifunctional device 10 and the calling device 70 cannot perform wireless communication of the FAX data of a print target. Also, the multifunctional device 10 holds the designated setting DWS1 when there is no FAX data of a print target in the situation where it is not possible to perform wireless communication by using the designated setting DWS1. Thereby, when there is no FAX data of a print target, the multifunctional device 10 can perform wireless communication with the PC 4 through the AP 6 by using the designated setting DWS1. Therefore, it is also possible to suppress the situation from occurring, in which the multifunctional device 10 cannot perform wireless communication with the PC 4. That is, according to this illustrative embodiment, the multifunctional device 10 can change the wireless setting from the designated setting DWS1 to the initial setting IWS at appropriate timing.

In the meantime, the multifunctional device 10 determines whether there is the FAX data of a print target by determining whether the specific information is received from the calling device 70 together with the SSID. In this illustrative embodiment, compared to the first illustrative embodiment, a new structure is required so that the calling device 70 transmits the specific information together with the SSID in accordance with the probe request. In other words, in the first illustrative embodiment, since the novel structure is not required, the multifunctional device 10 can determine whether there is the FAX data of a print target by using the communication of the general probe request. In this illustrative embodiment, the novel structure is required. However, since it is not necessary to store the receiving setting RWS in the NVRAMs 34, 84 of the multifunctional device 10 and the calling device 70, it is possible to reduce an amount of the information that the NVRAMs 34, 84 should store. Meanwhile, in this illustrative embodiment, the initial setting IWS is an example of the 'predetermined wireless setting.'

Although the specific illustrative embodiments have been specifically described, they are just exemplary and do not limit the claims. The technology defined in the claims includes a variety of modifications and changes to the above illustrative embodiments. For example, following modified embodiments may be adopted.

(1) In the first illustrative embodiment, the reception unit 60 of the multifunctional device 10 adopts the method of transmitting the probe request and receiving the SSID from the calling device 70, regarding the search of the SSID. Instead of this, the reception unit 60 of the multifunctional device 10 may transmit the probe request in which the SSID '001-RECV' is designated. In this case, the information transmission unit 108 of the calling device 70 (A) may transmit a response including the SSID '001-RECV' to the multifunctional device 10 when the SSID included in the current wireless setting of the calling device 70 is consistent with the SSID '001-RECV' included in the probe request and (B) may not transmit a response to the multifunctional device 10 when the SSID included in the current wireless setting of the calling device 70 is not consistent with the SSID '001-RECV' included in the probe request. Also in this configuration, the determination unit 58 of the multifunctional device 10 can determine whether the SSID received from the calling device 70 is '001-RECV' or not and can thus appropriately determine whether there is the FAX data of a print target. This modified embodiment is also included in the configuration where 'the determination unit determines whether the specific information is received from the second communication apparatus.'

(2) Also, in the first illustrative embodiment, the information transmission unit 108 of the calling device 70 may adopt a configuration in which the SSID included in the current wireless setting of the calling device 70 is periodically transmitted to the multifunctional device 10 even when the probe request is not received from the multifunctional device 10. In this case, the reception unit 60 of the multifunctional device 10 may periodically receive the SSID from the calling device 70 and store the SSID in the VRAM 40. In S18 of FIG. 2, the determination unit 58 of the multifunctional device 10 may determine that '001-RECV' has been received from the calling device 70 when there is '001-RECV' in the SSID stored in the VRAM 40. This modified embodiment is also included in the configuration where 'the determination unit determines whether the specific information is received from the second communication apparatus.'

(3) In the cases A2 and B2 of the first illustrative embodiment and the case A2" of the second illustrative embodiment, the wireless setting is changed from the wireless setting DWS1, DWS2 of the infrastructure mode to the wireless setting RWS or IWS of the ad hoc mode. That is, in the respective illustrative embodiments, the 'predetermined wireless setting' and the 'current wireless setting' are the wireless setting of the ad hoc and the wireless setting of the infrastructure mode, respectively. Instead of this, both the 'predetermined wireless setting' and the 'current wireless setting' may be the wireless settings of the ad hoc. Also, both the 'predetermined wireless setting' and the 'current wireless setting' may be the wireless settings of the infrastructure mode. Also, the 'predetermined wireless setting' may be the wireless setting of the infrastructure mode and the 'current wireless setting' may be the wireless setting of the ad hoc.

(4) In the above illustrative embodiments, the data of a communication target that is transmitted and received between the multifunctional device 10 and the calling device 70 is the FAX data. That is, generally speaking, the 'target data' includes the FAX data. However, the 'target data' may include data (for example, audio data, image data, the other data (for example, text data) and the like) other than the FAX data.

(5) In the above illustrative embodiments, the multifunctional device 10 and the calling device 70 are examples of the 'first communication apparatus' and the 'second communication apparatus.' However, the invention is not limited thereto. For example, the 'first communication apparatus' and the 'second communication apparatus' may be PCs, respectively. In this case, the technology disclosed in the specification may be used so as to transmit and receive data between a pair of PCs. Also, for example, the 'second communication apparatus' may be a PC and the 'first communication apparatus' may be a printer. In this case, for example, the print data that is transmitted from the PC to the printer may be an example of the 'first target data' and the 'second target data.' Generally speaking, the 'first (or second) communication apparatus' may be a device that performs wireless communication with the second (or first) communication apparatus.

(6) Also, in the above illustrative embodiments, the respective units 52 to 60 and the respective units 102 to 108 are implemented as the CPUs 32, 82 execute the programs. Instead of this, at least parts of the respective units 52 to 60 and the respective units 102 to 108 may be implemented by hardware such as logic circuit.

The technical elements illustrated in the specification or drawings exhibit the technical availability individually or by a variety of combinations thereof and are not limited to the combinations defined in the claims at the time of filing the application. Also, the technology exemplified in the specification or drawings achieves a plurality of purposes at the same time and the achievement of any one purpose has the technical availability.

What is claimed is:

1. A first communication apparatus for performing wireless communication with a second communication apparatus, the first communication apparatus comprising:
    a memory storing a predetermined wireless setting, which is assigned to the second communication apparatus;
    a work memory; and
    a processor communicatively coupled to the memory, the processor configured to execute instructions which, when executed, cause the first communication apparatus to:
    store a current wireless setting in the work memory;
    output a communication confirmation by using the current wireless setting;
    determine whether a first response to the communication confirmation has been received in a predetermined time period;
    if it is determined that the first response has been received in the predetermined time period, perform wireless communication with the second communication apparatus by using the current wireless setting and receive first target data from the second communication apparatus by using the current wireless setting;
    if it is determined that the first response to the communication confirmation has not been received in the predetermined time period, output a probe request and determine whether a second response to the probe request has been received;
    if it is determined that the second response to the probe request has not been received, maintain the current wireless setting;
    if it is determined that the second response has been received, further determine whether the second response to the probe request includes a particular service set identifier (SSID) including a specific character string corresponding to the predetermined wireless setting stored in the memory;
    if it is determined that the second response includes the particular SSID, establish wireless communication with the second communication apparatus by using the predetermined wireless setting and receive the first target data from the second communication apparatus; and
    if it is determined that the second response does not include the particular SSID, maintain the current wireless setting.

2. The first communication apparatus according to claim 1, wherein
    the memory further stores an initial wireless setting different from the predetermined wireless setting,
    wherein the processor further executes instructions causing the first communication apparatus to:
    determine whether second target data is ready to be transmitted from the first communication apparatus to the second communication apparatus;
    when the first response to the communication confirmation has not been received in the predetermined time period and the second target data is ready to be transmitted, transmit the second target data to the second communication apparatus by using the initial wireless setting.

3. The first communication apparatus according to claim 2, wherein
    the particular SSID is a combination of the specific character string and an initial service set identifier (SSID) included in the initial wireless setting.

4. The first communication apparatus according to claim 1, wherein
    the first target data from the second communication apparatus is FAX data received via an interface of the second communication apparatus, the interface being for communicating through a public telephone line.

5. The first communication apparatus according to claim 1, wherein the predetermined wireless setting is a wireless setting of an ad hoc mode with which the first communication apparatus and the second communication apparatus directly perform wireless communication without through an access point, the current wireless setting is a wireless setting of an infrastructure mode with which the first communication apparatus and the second communication apparatus indirectly perform wireless communication through the access point.

6. A second communication apparatus for performing wireless communication with a first communication apparatus, the second communication apparatus comprising:
   a memory storing a predetermined wireless setting;
   a work memory; and
   a processor communicatively coupled to the memory, the processor configured to execute instructions which, when executed, cause the second communication apparatus to:
   store a current wireless setting in the work memory;
   output a communication confirmation by using the current wireless setting;
   determine whether a first response to the communication confirmation has been received in a predetermined time period;
   if it is determined that the first response has been received in the predetermined time period, perform wireless communication with the first communication apparatus by using the current wireless setting and transmit first target data to the first communication apparatus by using the current wireless setting;
   if it is determined that the first response to the communication confirmation has not been received in the predetermined time period, in response to receiving a probe request, transmit a predetermined service set identifier (SSID) to the first communication apparatus and transmit the first target data to the first communication apparatus by using the predetermined wireless setting, the predetermined SSID being included in the predetermined wireless setting stored in the memory;
   if it is determined that the first response to the communication confirmation has not been received in the predetermined time period and there does not exist said first target data, maintain the current wireless setting.

7. A non-transitory computer readable recording medium storing a computer program for a first communication apparatus to perform wireless communication with a second communication apparatus, the first communication apparatus including a memory storing a predetermined wireless setting, which is assigned to the second communication apparatus, a work memory and a processor communicatively coupled to the memory, the processor enabling a computer, which is mounted to the first communication apparatus, to execute:
   storing a current wireless setting in the work memory;
   outputting a communication confirmation by using the current wireless setting;
   determining whether a first response to the communication confirmation has been received in a predetermined time period;
   if it is determined that the first response to the communication confirmation has been received in the predetermined time period, performing wireless communication with the second communication apparatus by using the current wireless setting and receiving first target data from the second communication apparatus by using the current wireless setting;
   if it is determined that the first response to the communication confirmation has not been received in the predetermined time period, outputting a probe request and
   determining whether a second response to the probe request has been received;
   if it is determined that the second response to the probe request has not been received, maintain the current wireless setting;
   if it determined that the second response to the probe request has been received, further determining whether the second response includes a particular service set identifier (SSID) including a specific character string corresponding to the predetermined wireless setting stored in the memory;
   if it is determined that the second response to the probe request includes the particular SSID, establishing wireless communication with the second communication apparatus by using the predetermined wireless setting and receiving the first target data from the second communication apparatus; and
   if it is determined that the second response to the probe request does not include the particular SSID, maintaining the current wireless setting.

8. A non-transitory computer readable recording medium storing a computer program for a second communication apparatus to perform wireless communication with a first communication apparatus, the second communication apparatus including a memory storing a predetermined wireless setting, a work memory and a processor communicatively coupled to the memory, the processor enabling a computer, which is mounted to the second communication apparatus, to execute:
   storing a current wireless setting in the work memory;
   outputting a communication confirmation by using the current wireless setting;
   determining whether a first response to the communication confirmation has been received in a predetermined time period;
   if it is determined that the first response to the communication confirmation has been received in the predetermined time period, performing wireless communication with the first communication apparatus by using the current wireless setting and transmitting first target data to the first communication apparatus by using the current wireless setting;
   if it is determined that the first response to the communication confirmation has not been received in the predetermined time period, in response to receiving a probe request, transmitting a predetermined service set identifier (SSID) to the first communication apparatus and transmitting the first target data to the first communication apparatus by using the predetermined wireless setting, the predetermined SSID being included in the predetermined wireless setting stored in the memory;
   if it is determined that the first response to the communication confirmation has not been received in the predetermined time period and there does not exist said first target data, maintaining the current wireless setting.

* * * * *